(12) United States Patent
Phillips

(10) Patent No.: US 8,118,532 B2
(45) Date of Patent: Feb. 21, 2012

(54) CONTAINER HAULING AND DELIVERY MECHANISM

(75) Inventor: Herbert J Phillips, Lawrenceville, GA (US)

(73) Assignee: Versa-Dol Holdings LLC, Buford, GA (US)

(*) Notice: Subject to any disclaimer, the term of this patent is extended or adjusted under 35 U.S.C. 154(b) by 702 days.

(21) Appl. No.: 12/108,298

(22) Filed: Apr. 23, 2008

(65) Prior Publication Data

US 2009/0267320 A1 Oct. 29, 2009

Related U.S. Application Data

(60) Provisional application No. 60/913,454, filed on Apr. 23, 2007.

(51) Int. Cl.
*B60P 1/04* (2006.01)
(52) U.S. Cl. ........ 414/467; 414/435; 414/441; 414/543; 414/563
(58) Field of Classification Search .................. 414/435, 414/441, 467, 474, 543, 563
See application file for complete search history.

(56) References Cited

U.S. PATENT DOCUMENTS

| 4,082,157 A * | 4/1978 | Sternberg ..................... 180/14.3 |
| 4,599,040 A * | 7/1986 | Rasmussen .................... 414/813 |
| 5,407,251 A * | 4/1995 | Ritchie et al. ........... 298/23 MD |
| 7,043,932 B2 * | 5/2006 | Tofflemire ...................... 62/239 |
| 2004/0151565 A1* | 8/2004 | Zaun et al. ..................... 414/500 |
| 2007/0071586 A1* | 3/2007 | Born et al. ..................... 414/549 |

* cited by examiner

*Primary Examiner* — Saul Rodriguez
*Assistant Examiner* — Willie Berry, Jr.
(74) *Attorney, Agent, or Firm* — Smith Risley Tempel Santos LLC; Gregory Scott Smith

(57) ABSTRACT

A container transportation system that includes a dolly system that can be mounted underneath the container and then used, optionally in cooperation with a boom or lift, to navigate a container to a desired location. The dolly includes a motor mounted in a swivel bracket that facilitates movement of the dolly for storage. The dolly includes a locking mechanism to clamp in on a load. The dolly can be navigated through the use of a wireless remote control unit that is either held by an operator or by a device that is integrated into the electronics of a road tractor and/or dolly system. The system may include a mounting system for mounting the dolly to a road tractor and a boom for lifting the dolly from a deployed state to a loaded state.

16 Claims, 15 Drawing Sheets

CONTAINER HAULING AND DELIVERY MECHANISM

CROSS-REFERENCE TO RELATED APPLICATIONS

This is a non-provisional application being filed under 35 U.S.C. 111 and claiming the benefit of United States Provisional Application for Patent filed on Apr. 23, 2007 and assigned Ser. No. 60/913,454—which application is hereby incorporated by reference.

BACKGROUND

If you have not noticed them, you have certainly seen them. They are everywhere! And despite their rudimentary look, simplistic design, and apparent lack of novelty, these things have been an integral part in revolutionizing, not just the shipping world, but the entire world. And what is more amazing is that they are not done yet. What are these "things"? They are the big, bulky, boxy and typically unattractive shipping or storage container boxes fabricated from steel, aluminum or other composite materials. They are hauled down the highway on semi trucks, over the rails on trains, stacked up high aboard ships, and neatly lined along the docks, warehouses and storage yards across the planet.

Marc Levinson describes how these containers have been an integral part in revolutionizing our world in his book titled "THE BOX: HOW THE SHIPPING CONTAINER MADE THE WORLD SMALLER AND THE WORLD ECONOMY BIGGER" published by Princeton University Press. Levinson describes the date of Apr. 26, 1956 in which fifty-eight of these containers were loaded onto the ship the IDEAL-X in Newark, N.J. and arrived in Houston, Tex. five days later. Fifty-eight waiting trucks then hauled the metal boxes to their respective destinations. Levinson describes this as the beginning of a revolution. Levinson goes on to describe some of the outcomes of this revolution. Things that today are commonplace but, prior to THE BOX, were completely unknown to us. For instance, today China is the world's workshop, building items inexpensively and shipping them all around the world in . . . THE BOX. Before the introduction of these containers, it was not common place for shoppers to find items such as Brazilian shoes and Mexican vacuum cleaners in the middle of Kansas. The little island of Japan did not have the benefit of sitting down to a meal of beef from Wyoming raised cattle. French clothing designers did not have the benefit of having the apparel cut and sewn in Turkey or Vietnam.

Levinson states that the container was instrumental in revolutionizing the world, not just because it enabled the above-described activities as well as many others, but that it enabled such shipping to be conducted in a cost effective manner. But, Levinson is clear to indicate that the container is simply a soulless, steel box held together with welds and rivets, with a wooden floor and two enormous doors at one end. In other words, the revolution was not just THE BOX, but rather how the box was used.

A typical cycle for one of these containers starts with the delivery of the container to a source of goods—such as a warehouse or a manufacturer's facilities. Typical containers measure 8 feet wide, 8.5 feet high, and 20, 40, 48 or 53 feet long. The container can then be loaded from back to front and floor to ceiling and then locked. The next step is to deliver the container to a shipping yard. The container can be moved in a variety of manners. The trucking options include the use of a tilt-bed truck, a tilt back trailer or chassis such as the products manufactured and sold under the name of LANDOLL and a chassis connected to a road tractor (typically by means of a fifth wheel). Using a tilt-bed truck or a tilt-back trailer, the bed is tilted, similar to a tow truck bed, and the container is winched onto the bed of the truck or trailer. The bed is then lowered or returned to a horizontal position and the container is clamped down. For a chassis, a crane or some other lift must be used to pick up the container and set it onto the trailer or chassis. In either case, the clamped down container can then be hauled over the road either to its intended destination or to its next point along the route. Depending on the location of the source, the container may actually begin its journey stacked onto the bed of a train or even directly loaded onto a ship. Thus, the path of a container can range from traveling from the manufacturer by truck to a destination just down the road, to traveling to a distant country over a combination of truck, trailer, chassis, rail, ship and/or air lifting.

These containers that have been so instrumental in revolutionizing our world have a few drawbacks. First of all they have a limited life in the shipment industry. Once the containers have been used a certain number of times, or by economic aging, they are then retired. Another drawback is that due to the size of these monsters, it is not an easy task to simply throw them away. However, the creative and green oriented minds of our world have discovered that the retired containers have many other uses. They can easily be converted into inexpensive but robust living quarters. For instance, when hurricane Katrina brought havoc on New Orleans, architecture students at Auburn University responded by designing simple housing shelters to be shipped to New Orleans. Other uses of the containers have included personal storage containers, underground shelters, field operation units (such as telecommunication switching centers), etc.

The new and innovative uses for containers, as well as the originally intended uses, have given rise to some deliverability issues. Often times, the desired placement locations for containers are not as widespread and open as at the typical shipping yards. To deliver containers using the current state-of-the-art delivery mechanisms, two approaches are typically used. The tilt-bed trucks and/or tilt-back trailers can place a container at a desired location but, to do so the delivery space must be at least twice the length of the container plus additional tractor and wiggle room. For instance, to deliver a 40 foot container using a tilt-back trailer, the delivery site must provide at least 112 to 132 feet of maneuverability space (40 feet for the container, 52 feet for the bed and 20-40 feet for the tractor and maneuverability).

Often times this space is simply not available. In such situations, alternate delivery means must be employed. For instance, a crane can be used to lift the container off of a trailer/chassis and set the container in the desired location. However, in many situations this approach is not practical in that a crane may not be located at the site and it may not be economically feasible to bring a crane to the site.

Another approach is to place the container at one location and then push the container into the desired location. This approach is also deficient for several reasons. For instance, the container can easily be damaged during this process thereby breaching the water tightness of the container. In addition, dragging the container and or the trailer/chassis may destroy the surface area surrounding the desired location. Other limitations are access restrictions due to utilities, boundaries (fences, walls, landscaping, etc), structures or the like.

Thus, it is apparent that there is a need in the art for a technique to deliver and place containers at a desired location. Further, there is a need in the art for a technique that can deliver and/or remove containers from a location in which little room for maneuverability is available.

In addition, a very important issue that faces the trucking industry is the goal to eliminate, whenever possible, being subject to dry runs—or moving an empty truck. For instance, when a trucker delivers a load or container, significant cost is realized in time and fuel if the trucker is not able to handle another load to head back with or to take to another location. In the container delivery industry, this issue is presently magnified because the types of load available to a truck equipped to transport containers are limited. Thus, a trucker needs the ability to haul another load (i.e., container or trailer) as backhaul or to other destinations and repeat the process. If such arrangements cannot be made, then the trucker losses significant revenue generation capabilities incurring deadhead or layover costs waiting for a load to become available. These losses could be reduced if the trucker has more options available with regards to the type of loads that can be carried (i.e., container or trailer).

Thus, there is a need in the art for a technique to deliver containers that does not limit the type of loads that can be carried to only containers, but rather, provides for compatibility for carrying containers, trailers, chassis, etc. and that can maintain access to the fifth wheel for connecting and hauling purposes.

These and other needs in the art are addressed by the various embodiments of the invention as described in the remainder of this specification.

BRIEF SUMMARY

Various embodiments, features and aspects of the present invention meet the above-identified needs in the art, as well as others, in providing a motorized dolly, a boom system and a dolly storage or mounting system that can be used in the transport and placement of loads—including but not limited to shipping containers. In one embodiment of the present invention, the boom and the storage system are integrated into or mounted to a frame, such as the frame of a road tractor. The boom can lift the dolly from the ground and place the dolly into the storage system. The truck can then travel to the destination of a load to be moved. Upon arriving at the load, the boom can operate to remove the dolly from the storage system and place the dolly onto the ground. The boom can be connected to the load and then operated to raise one end of the load. Once the load is lifted, the motorized dolly can be navigated under the load. For instance, in one embodiment of the invention the dolly includes a surface that receives the load. The surface includes a plurality of rollers that can engage the bottom surface of the load and allow the boom to pull the load to position and/or the motorized dolly is driven to the desired position under the load. The load can take on a variety of forms and although the present invention is not limited to operation with any particular type of load, embodiments of the present invention will be described as moving shipping containers as the load.

The load can be secured to the dolly in a variety of manners including straps, clamps, bolts, pins, ropes, chains, twist and lock connectors or the like. In one exemplary embodiment, the dolly includes locking clamps that are mechanical interference locks that can be retracted to apply pressure against the sides of the load and secure the load in place.

In one embodiment of the invention, the boom is attached to the frame of a road tractor. A fifth wheel is attached to the boom and then a turntable is secured to the fifth wheel which rests on the frame for support. In this embodiment, the boom can lower the load onto the turntable. The load can be secured to the turntable in a variety of manners including twist and lock connectors, or other devices approved by the Department of Transportation.

A light assembly can be either integrated into the dolly or attached to the load or dolly to meet Department of Transportation requirements.

At this point the load can then be transported to a destination sight where it can then be unloaded.

The dolly can take on a variety of forms depending upon the particular embodiment being employed and/or the type of load to be transported. In one embodiment, the dolly includes multiple road-ready wheels configured as one or more road wheel assemblies and one or more traction wheels configured as a traction wheel assembly. The road-ready wheels in one embodiment are simply attached to an axel and do not have power applied. In such an embodiment, one or more traction wheel assemblies can be used to drive or navigate the dolly. In a preferred embodiment, at least two traction wheels are utilized in the traction wheel assembly. However, in other embodiments, one or more of the road-ready wheels may be driven by a motor and as such, eliminate the need for the traction wheel assembly.

In one embodiment, the dolly may include a connector for being coupled to the boom. Once coupled to the connector, the boom can lift and store the dolly. Advantageously, multiple dollies can be carried on a truck to further facilitate the placement of a load. For instance, one dolly can be mounted to a storage system on the road tractor and another dolly mounted to the load. The load can then be attached to the road tractor and hauled to a desired location. The boom can lift the load off of the road tractor and move the load back from the road tractor. The boom can then be disconnected from the load and then used to extract the second dolly from the storage system. The boom can place the dolly on the ground then, upon being reconnected to the load, the boom can lift the load to enable the second dolly to be navigated under the load. Once the second dolly is secured to the load, either one or both of the dollies can be driven and steered to move the container to a desired location.

These embodiments, features and aspects, as well as other are presented in more detail in conjunction with the figures.

BRIEF DESCRIPTION OF THE SEVERAL
VIEWS OF THE DRAWING

FIG. 5A illustrates an exemplary user interface panel for the control box 702 illustrated in FIG. 5.

DETAILED DESCRIPTION OF EMBODIMENTS OF THE INVENTION

Figure 1:
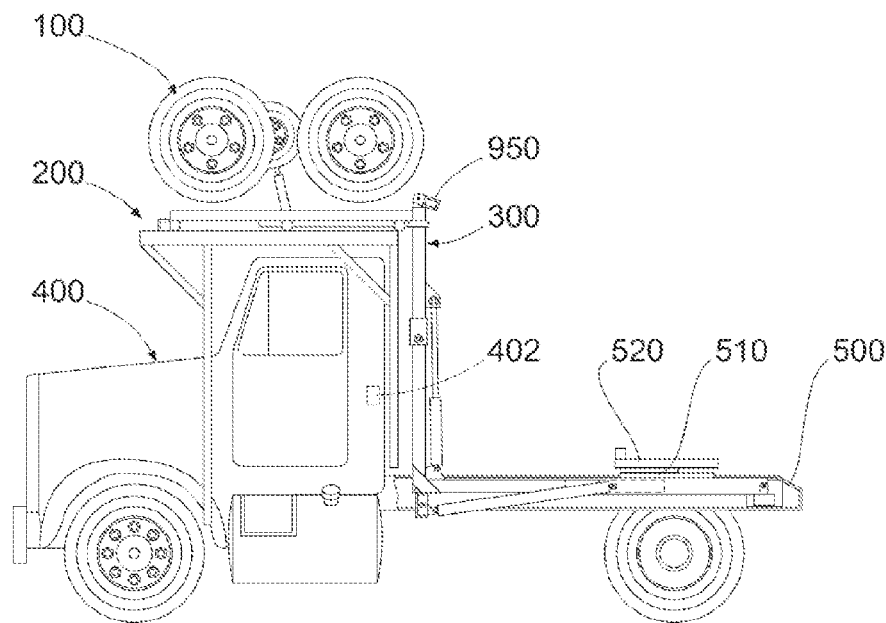
FIG. 1 is a side view elevation that illustrates an exemplary embodiment of the present invention in a fully stored and non-loaded state.

The present invention, as well as features and aspects thereof, is directed towards providing a novel transportation of a load, in particular, a shipping container. In general, one embodiment of the present invention includes a dolly that can be used to facilitate transporting and placement of containers. The dolly includes multiple wheel assemblies that can be connected in pairs in an axel configuration. The axels are mounted to a frame that can receive the load. The dolly can be positioned under the load and then used to help maneuver the load to a desired position or, operate in conjunction with a vehicle to transport the load to a new location.

The dolly may also operate in conjunction with a boom or lift. In this embodiment, the boom can be used to lift one end of the load to allow for the placement of the dolly under the load. In another embodiment, the boom can be integrated into a vehicle or mounted upon a vehicle, such as the frame of a road tractor, or some other form of truck chassis. In a particular embodiment, the boom may be mounted to the frame of a road tractor and a fifth wheel can be mounted to the boom. A turntable equipped with a king pin on the back side can then be mounted to the fifth wheel. In this embodiment of the invention, the boom can be used to lift the load to enable placement of the dolly. Further, the boom can then lower the raised end of the load onto the turntable for being secured. Once the load is secured to the turntable and the dolly, the load can be transported to a new location. Upon arriving at the new location, the boom can lift one end of the load from the turntable and assist the dolly in guiding the load to a desired location.

A more detailed description of an embodiment includes a motorized dolly, a boom system and a dolly storage or mounting system. In this embodiment the boom and a storage system are integrated into or mounted to the frame of a road tractor. However, the boom and storage system can be mounted to a trailer/chassis or other mobile device in other embodiments. The boom can lift the dolly from the ground and place the dolly into the storage system. The trucker can then travel to the destination of a load to be moved. Upon arriving at the load, the boom can operate to remove the dolly from the storage system and place the dolly onto the ground. The boom can be connected to the load and operate to raise one end of the load. Once the load is lifted, the dolly can be navigated under the load. The load can be partially lowered to help facilitate movement of the dolly towards the rear of the load. For instance, in one embodiment of the invention the dolly includes a surface that receives the load. The surface includes a plurality of rollers that can engage the bottom surface of the load and allow the boom to pull the load into position and/or the motorized dolly is driven into the desired position.

The load can be secured to the dolly in a variety of manners including straps, clamps, bolts, pins, ropes, chains, or the like. In one exemplary embodiment, the dolly includes locking clamps that can be retracted to apply pressure against the sides of the load and secure the load in place.

The boom can lower the load onto the turntable. The load can be secured to the turntable in a variety of manners including twist and lock connectors, or other devices approved by the Department of Transportation.

A light assembly can be integrated into the dolly or attached to the dolly in a manner that meets Department of Transportation requirements. In other embodiments, the dolly may not include a light assembly. Rather, an independent light assembly may be attached to the container or load in a manner that meets the Department of Transportation requirements. In still another embodiment, a light assembly can be attached to or mounted to the container but be communicatively coupled to the dolly system or a controller box for the dolly system.

At this point the load can then be transported to a destination sight where it can then be unloaded.

The dolly can take on a variety of forms depending upon the particular embodiment being employed and/or the type of load to be transported. In one embodiment, the dolly includes multiple road-ready tires and one or more traction tires. The road-ready tires in one embodiment are simply attached to an axel and do not have power applied. In such an embodiment, the one or more traction wheels in the traction wheel assembly can be used to drive or navigate the dolly. In a preferred embodiment, at least two traction wheels are utilized in the traction wheel assembly. However, in other embodiments, one or more of the road-ready wheels in the road wheel assembly may be driven by a motor and as such, eliminate the need for the traction wheel assembly.

In one embodiment, the dolly may include a connector for being coupled to the boom. Once coupled to the connector, the boom can lift and store the dolly. Advantageously, multiple dollies can be carried on a truck to further facilitate the placement of a load. For instance, one dolly can be mounted to a storage system on the truck and another dolly mounted to the load. The load can then be attached to the truck and hauled to a desired location. The boom can lift the load off of the truck and move the load back from the truck. The boom can then be disconnected from the load and then used to extract the second dolly from the storage system. The boom can place the dolly on the ground then, upon being reconnected to the load, the boom can lift the load to enable the second dolly to be navigated under the load. Once the second dolly is secured to the load, either one or both of the dollies can be driven and steered to move the container to a desired location. This embodiment advantageously enables a load to be navigated into a very small space that normally could not be possible utilizing other existing methods.

Turning now to the figures in which like references refer to like elements throughout the various views, selected embodiments, features and aspects of the various embodiments are presented in more detail.

FIG. 1 is a side view elevation that illustrates an exemplary embodiment of the present invention in a fully stored and non-loaded state. The illustrated embodiment shows 5 main components that can be included in various embodiments of the invention but that are not necessarily required elements in all embodiments of the invention. The illustrated embodiment includes a dolly system 100, a dolly mount 200, a boom or lift 300, a road tractor cab 400 and a road tractor frame 500. The dolly system 100 is shown as being stored onto the dolly mount 200 which is fixed above the cab 400 of a road tractor. The cab 400 is integral to the truck frame 500 on which the boom 300 is mounted. It will be appreciated that this is just one example of an embodiment of the present invention. Other embodiments of the invention may simply include the dolly system 100. Another embodiment of the invention may include the dolly system 100 and the boom 300 mounted to a mounting frame that is not a part of a road tractor. For instance, the mounting frame may be mounted to a movable base located on board a ship or at a ship yard. The frame may also be mounted to a trailer chassis. In yet another embodiment, the mounting frame may include a king pin and be mounted to the fifth wheel of a road tractor and include yet another fifth wheel that can be utilized when the mounting frame is installed on the road tractor. Those skilled in the art will appreciate the various embodiments of the present invention and the combination of one or more of the various elements to create an embodiment.

FIGS. 2-8 illustrate the steps involved is dismounting the dolly system 100 from the stored position illustrated in FIG. 1, to a fully loaded position ready for hauling of a load or placement of a load.

Figure 2:
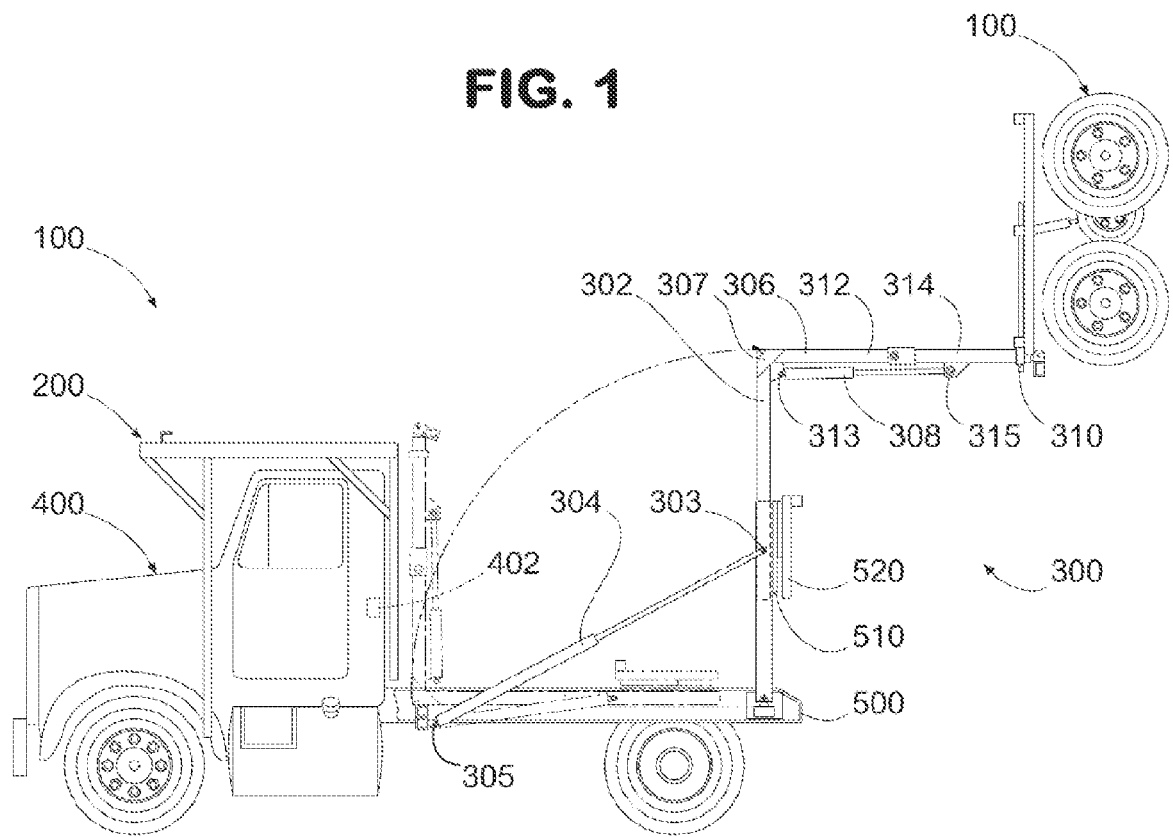
FIG. 2 is a side-view elevation that illustrates an exemplary embodiment of the present invention during one stage of the process of deploying a dolly system.

FIG. 2 is a side-view elevation that illustrates an exemplary embodiment of the present invention during one stage of the process of deploying a dolly system. At this stage, the dolly system 100 has been connected to the boom 300 and has been removed from the dolly mount 200. The boom 300 is shown as including a base arm 302 that on one end is pivotally connected to the end of the frame 500 that is distal from the cab 400. The other end of the base arm 302 is attached to an extension arm 306 at a substantially 90 degree angle and may include gusset 307 or similar structure for additional support.

The base arm 302 is also coupled to the frame 500 through cylinder(s) 304. Although only one cylinder 304 is illustrated, in an exemplary embodiment two cylinders are utilized with one cylinder on each side of the drive train. However, it will be appreciated that a single cylinder or more than two cylinders can be utilized. The cylinders 304 are pivotally connected to the base arm 302 at point 303 on one end, and is pivotally connected to the frame 500 at point 305 at the other end. The cylinders 304 operate to move base arm 302 from the stored position (as illustrated in FIG. 1 and ghosted in FIG. 2) to the extended position of FIG. 2 by expanding the cylinders 304. Retracting the cylinders 304 will return the base arm 302 to the stored position.

Extension arm 306 includes a cylinder 308 and a connector 310. The cylinder 308 is pivotally connected between a point 313 on a first length 312 of arm 306 and a point 315 on a second length 314 of extension arm 306. The connector 310 receives a portion of the dolly 100 (as described below) and holds the dolly 100 while the dolly is being moved from a stored position to a fully deployed position.

Figure 3:
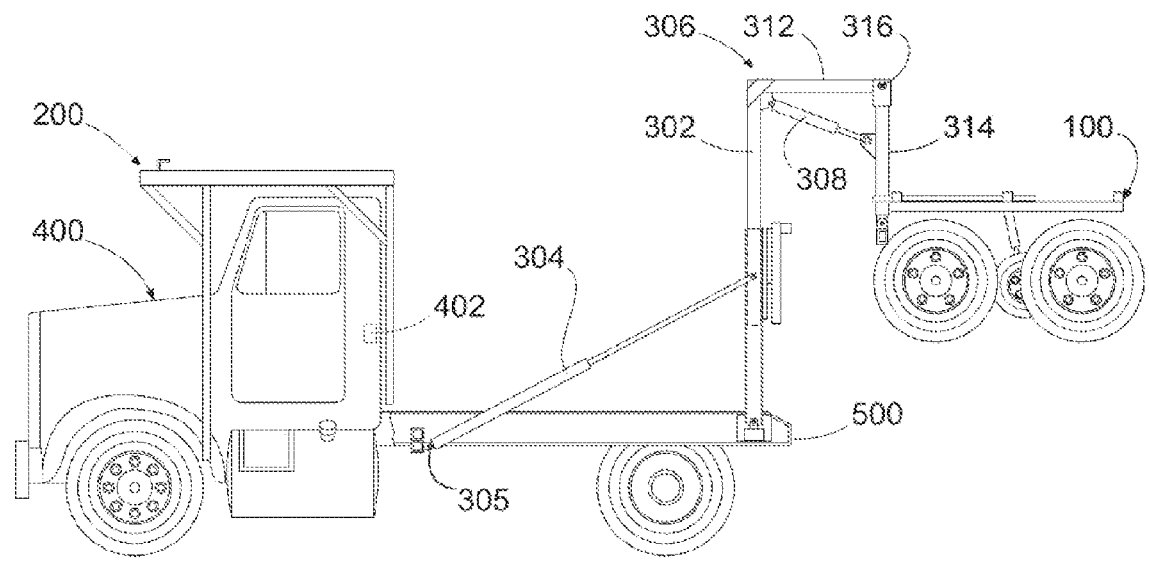
FIG. 3 is a side-view elevation that illustrates an exemplary embodiment of the present invention during another stage of the process of deploying a dolly system.

FIG. 3 is a side-view elevation that illustrates an exemplary embodiment of the present invention during another stage of the process of deploying a dolly system. The first length 312 of extension arm 306 and the second length 314 of extension arm 306 are pivotally connected at point 316. In the illustrated state, the cylinder 308 is shown as having retracted, and thereby causing length 314 to pivot downward from point 316.

Figure 4:
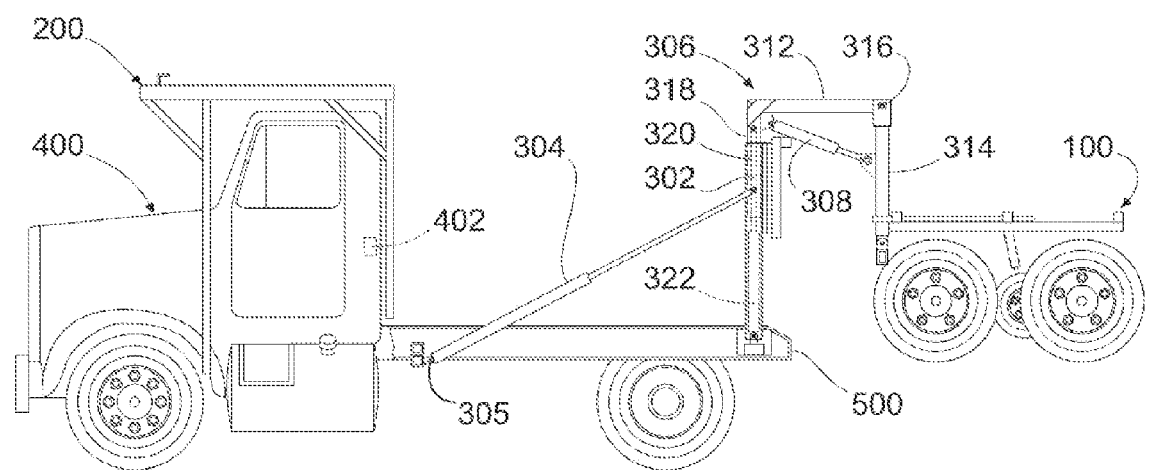
FIG. 4 is a side-view elevation that illustrates an exemplary embodiment of the present invention during yet another stage of the process of off-loading a dolly system.

FIG. 4 is a side-view elevation that illustrates an exemplary embodiment of the present invention during yet another stage of the process of off-loading a dolly system. At this stage, the base arm 302 is shown as including a base length 320 and an extension length 318. A cylinder 322 is rigidly connected at one end to the base length 320 of the base arm 302 and at the other end to the extension length 318. The base arm 302 can be telescoped between an extended position (as shown in FIG. 3 to a lowered position as shown in FIG. 4 by extending or retracting cylinder 322.

The dolly system 100 can thus be moved from the dolly mount 200 by the boom 300 to a fully deployed position by manipulating the cylinders 304, 308 and 322. Once the wheels of the dolly system 100 are resting on the deployed surface (such as the ground), the dolly system 100 can be disconnected from connector 310. Typical control mechanisms for the cylinders include levers mounted to the frame. However, it will be appreciated that the control of the cylinders can be accomplished in any of a variety of manners, including traditional levers, as well as wireless or tethered control boxes, buttons, microprocessors running software programs to maneuver the cylinders to defined positions and switches to sequence through or select particular positions, or the like.

Figure 5:
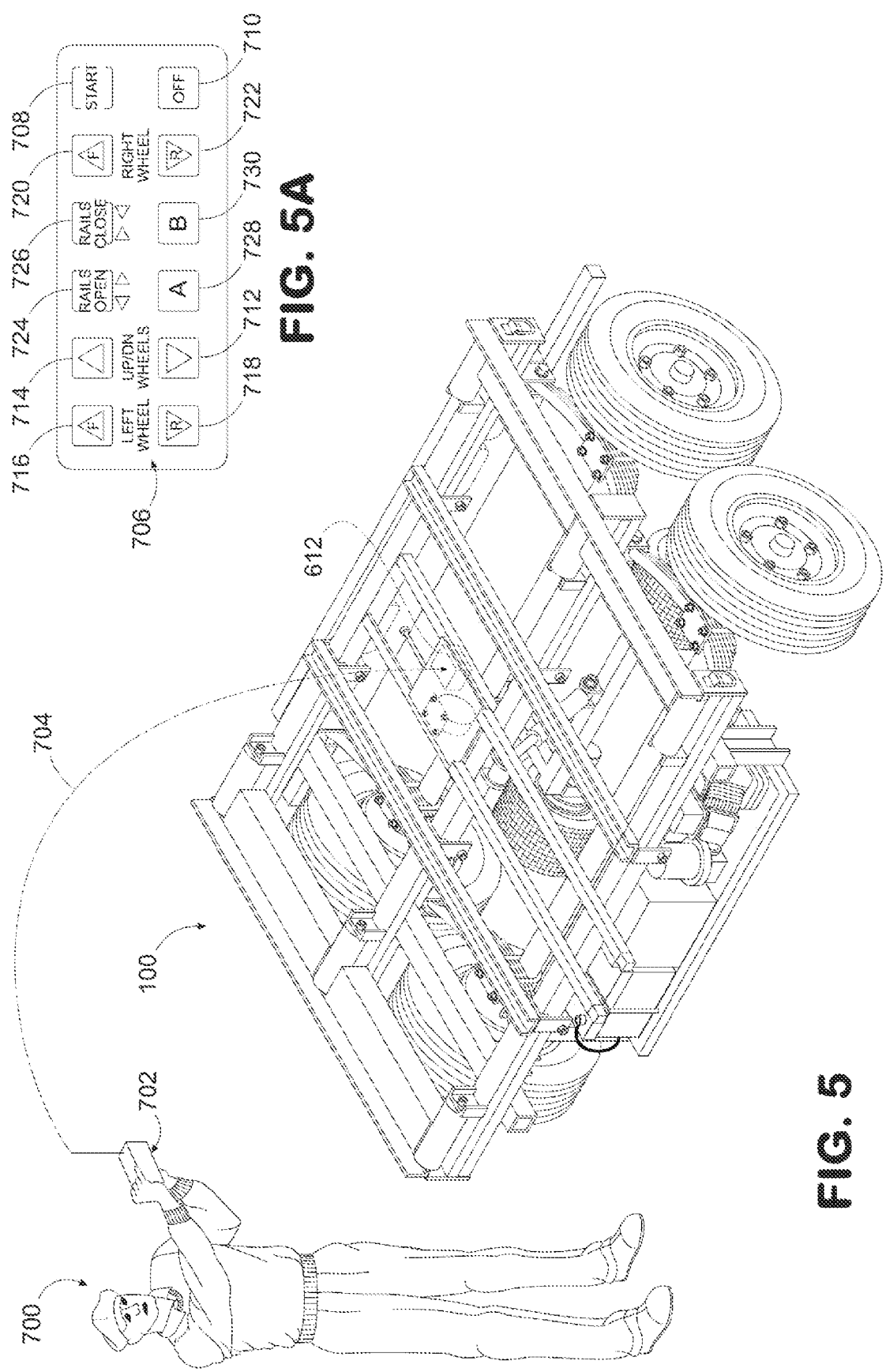
FIG. 5 is a perspective view of an embodiment of the dolly system 100 as fully deployed.

FIG. 5 is a perspective view of an embodiment of the dolly system 100 in a fully deployed state. A user 700 can then guide the dolly system 100 to a desired location. In the illustrated embodiment, the user 700 is shown as using a control box 702 which wirelessly communicates with a controller box 612 mounted to the dolly 100 over communication path 704. The controller box 612 may contain a receiver and a microcontroller, as well as a variety of control circuits. It will be appreciated that the dolly system 100 could be controlled using a variety of techniques such as a tethered control box, RF transmissions, infrared transmissions, dolly mounted control panel, or even by manually maneuvering the dolly system 100.

Figure 6:
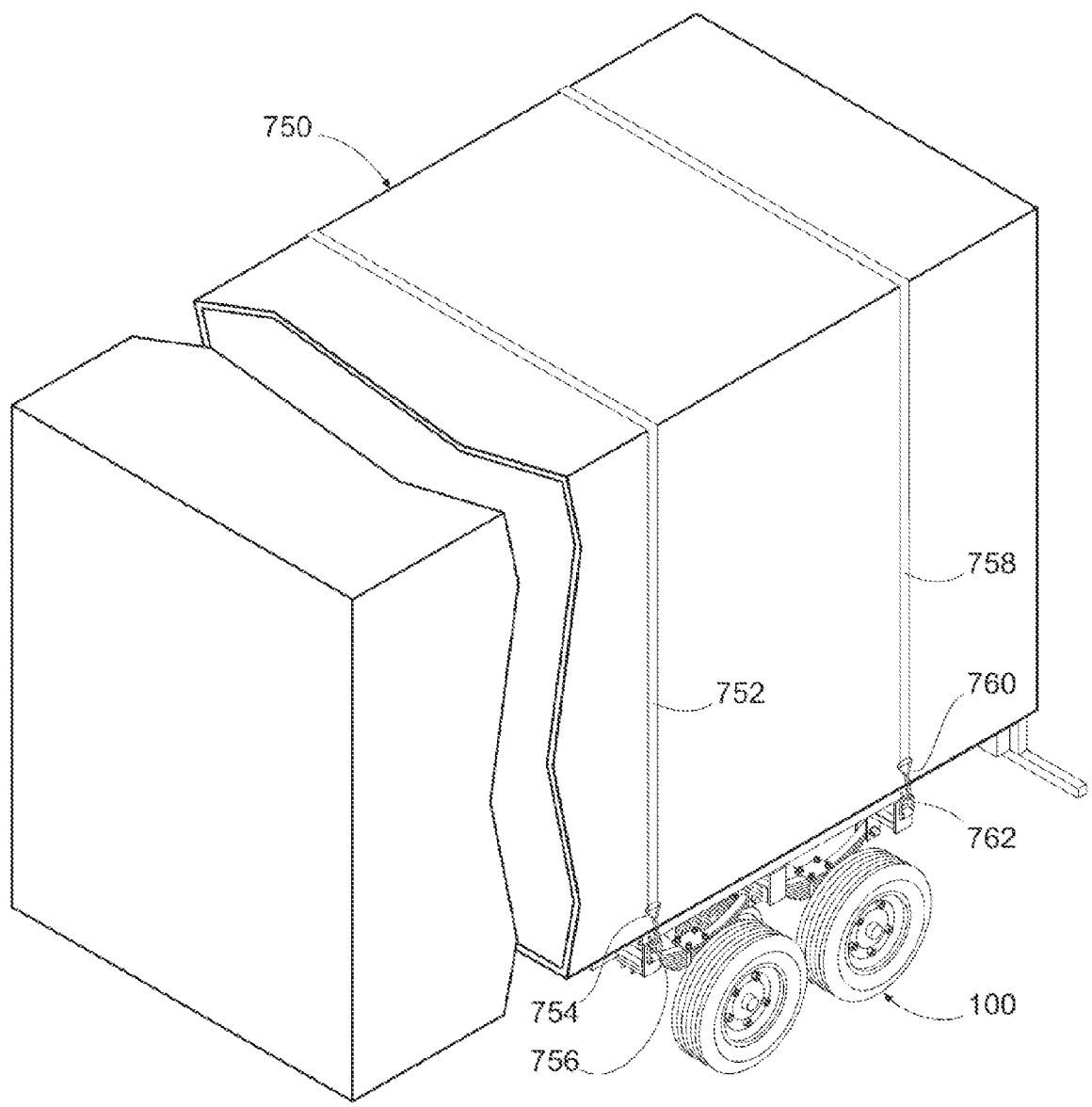
FIG. 6 is a perspective view of an exemplary dolly system attached to a load.

FIG. 6 is a perspective view of an exemplary dolly system attached to a load. In the illustrated embodiment, the load 750 rests on dolly system 100 and is secured to the dolly system 100 by strap 752 shown as being coupled to the dolly with a hook 754 inserted through loop 756. Likewise, strap 758 is coupled to the dolly system 100 with a hook 760 inserted through loop 762. It will be appreciated that the opposite end of the straps are similarly connected on the other side of the dolly system 100. In addition, as those skilled in the art will be aware, the straps can be tightened using a variety of techniques such as ratchets, load binders, etc.

Figure 7:
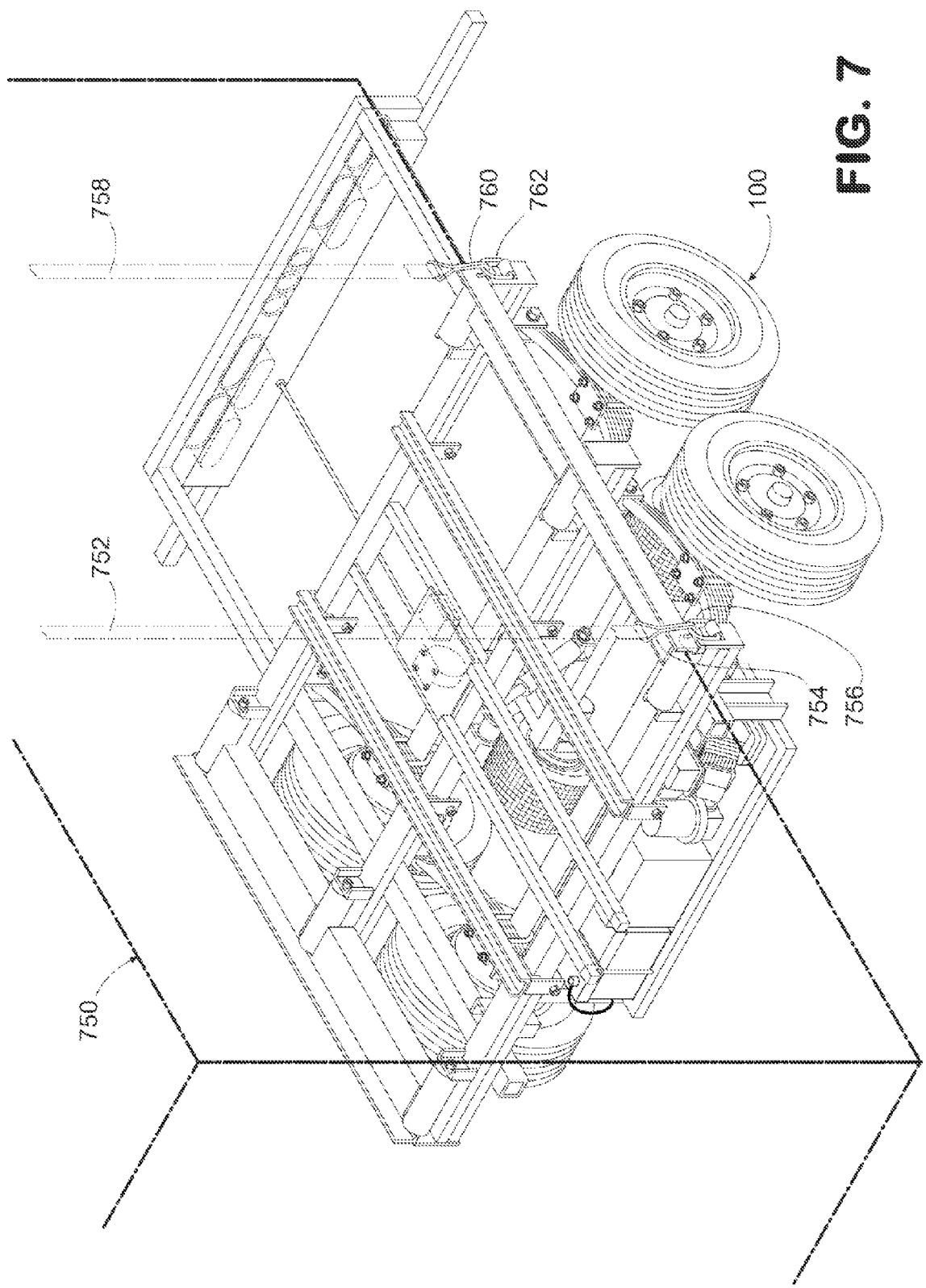
FIG. 7 is a perspective view of the exemplary dolly system attached to the load as illustrated in FIG. 6 with the load being ghosted to show the relative position of the dolly system under the load.

FIG. 7 is a perspective view of the exemplary dolly system attached to the load as illustrated in FIG. 6 with the load being ghosted to show the relative position of the dolly system under the load.

Figure 8:
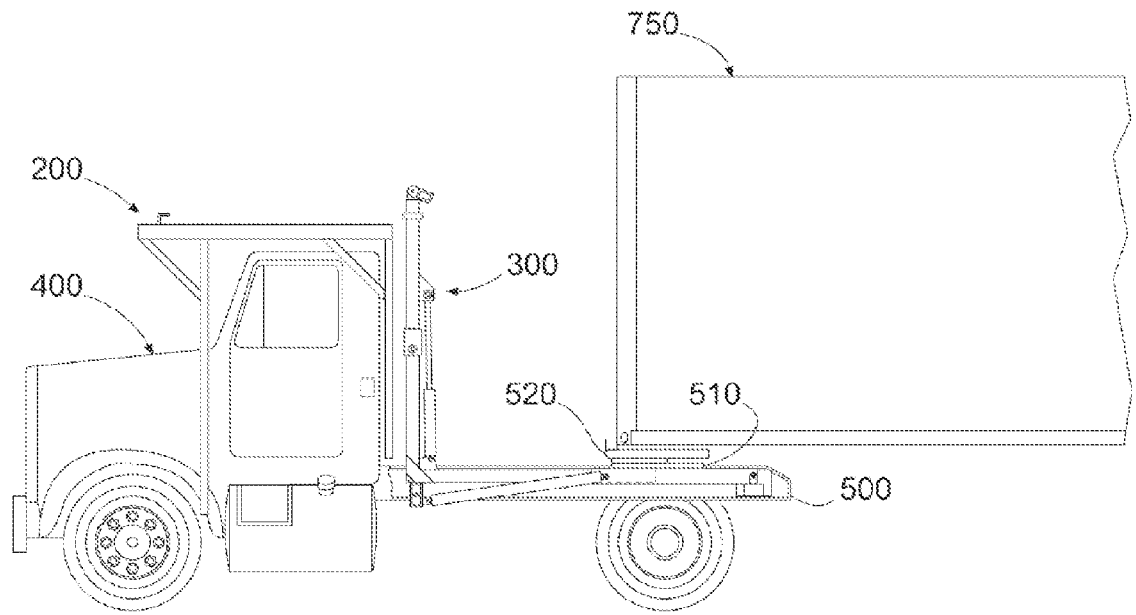
FIG. 8 is a side-view elevation that illustrates a storage container mounted to a hauling truck equipped with an embodiment of the present invention.
Figure 18:
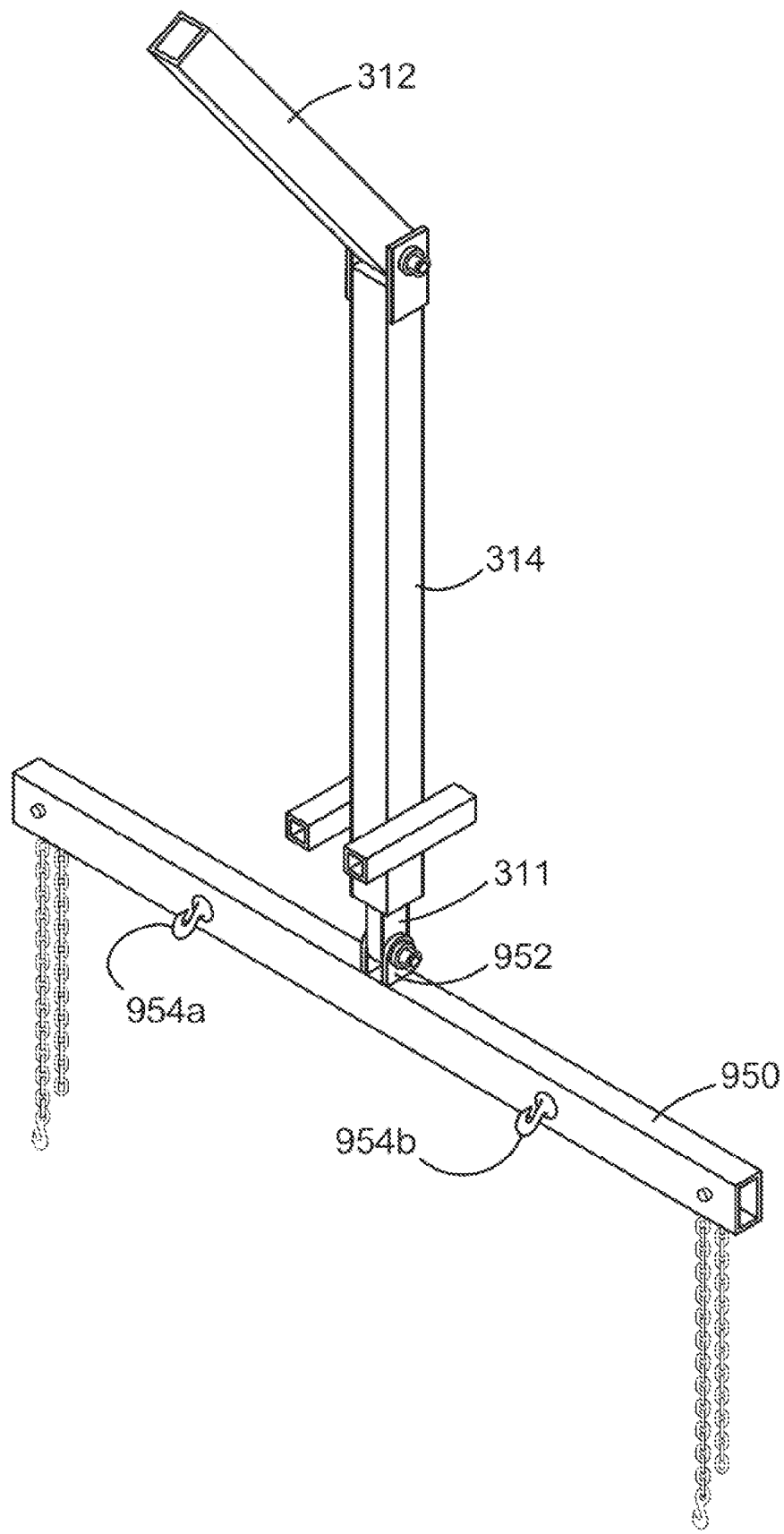
FIG. 18 is an exemplary T-bar that can be attached to the boom to facilitate loading, lifting and moving of a load or container.

FIG. 8 is a side-view elevation that illustrates a storage container mounted to a road tractor equipped with an embodiment of the present invention. The boom 300 is mounted to the frame 500 of the road tractor. A fifth wheel 510 is mounted to the boom 300 and a turntable 520 is mounted to the fifth wheel. The turntable 520 is further described in conjunction with FIG. 16. Once the load 750 is attached to the dolly system 100, the boom 300 can be used to attach to one end of the load 750 and align the load with a compatible connector located on the turntable 520. For instance, in one embodiment, the load may be a standard shipping container that includes twist-lock receptacles on the lower corners of the shipping container. The turntable 520 can have the mating twist-lock connectors that are inserted into the twist-lock receptacles and then twisted and locked into position. In an alternate embodiment, the load 750 may include a king pin to mate with a fifth-wheel mounted to the frame 500, the boom 300 or otherwise. Those skilled in the art will appreciate that a variety of other techniques may also be utilized for attaching the load to the turntable 520 and/or the fifth wheel and the present invention is not limited to any particular embodiment disclosed herein. It should be appreciated that the boom can be coupled to the load 750 by using chains, fork-lift style connectors or a T-bar 950 (as best illustrated in FIG. 18) that can be mounted to the end of the extension arm 314 and then the T-bar 950 can be mounted to the load.

Figure 15:
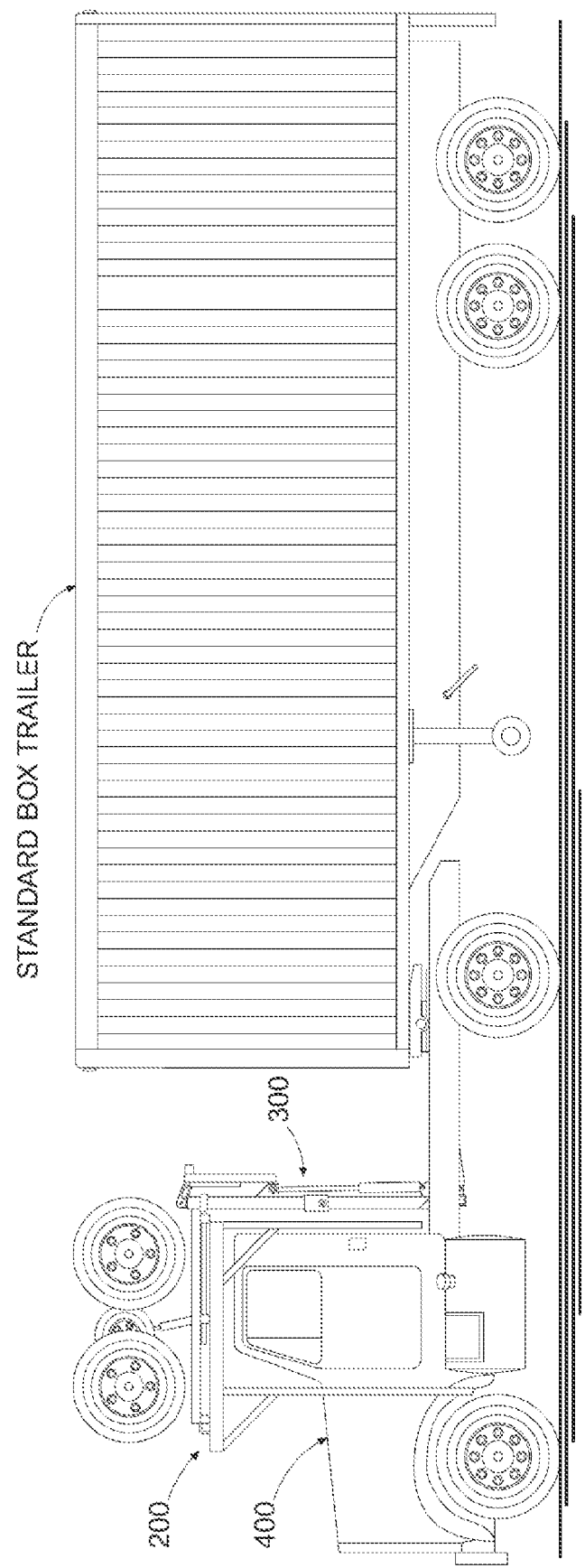
FIG. 15 is a conceptual diagram illustrating a road tractor equipped with a fifth wheel that can be used to transport a standard trailer while the dolly and the turntable systems are stored.

It should be appreciated that the cab 400 and frame 500 can be custom built, or custom modified to accommodate the dolly system 100, dolly mount 200 and the boom 300. However, it will also be appreciated that such custom vehicles have some disadvantages. For instance, if a road tractor can pull only a conventional container chassis, there is a great possibility that after each container delivery, the trucker will be subject to a dry run as he or she returns to the place of origin. In one embodiment of the invention, the boom 300 and the mount 200 can be constructed so as to still allow the road tractor to accommodate other types of loads. For instance, as illustrated in FIG. 1, the frame 500 may include a fifth wheel 510 that can accommodate a standard king pin equipped trailer. This configuration advantageously provides greater flexibility in hauling loads by a road tractor equipped with an embodiment of the present invention. FIG. 15 is a conceptual diagram illustrating a road tractor equipped with a fifth wheel that can be used to transport a standard trailer while the dolly and turntable systems are stored.

Figure 9:
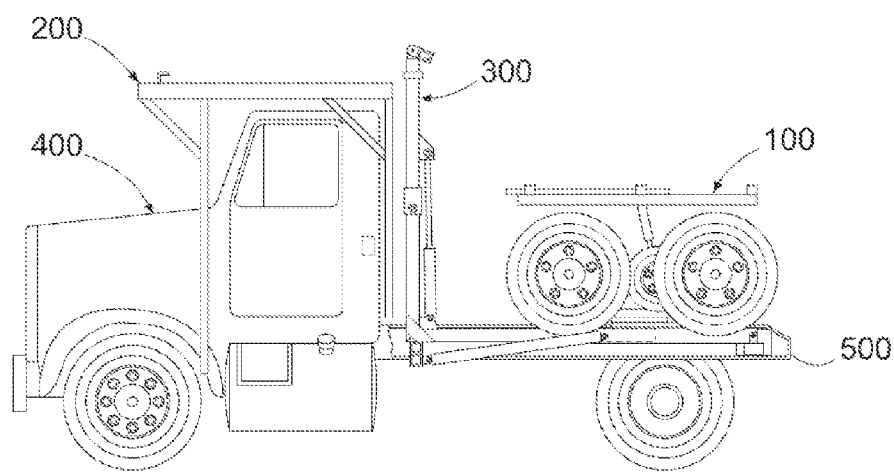
FIG. 9 is a side-view elevation of an alternate method for storing the dolly system onto a truck equipped with an embodiment of the present invention.

The dolly system 100 can be used in a variety of configurations and can be transported in a variety of manners. FIGS. 1-8 show a non-limiting example of one system and method for mounting, maneuvering, transporting and utilizing the dolly system 100. For instance, FIG. 9 shows an alternative manner to transport the dolly system 100. FIG. 9 is a side-view elevation of an alternate method for storing the dolly system onto a truck equipped with an embodiment of the present invention.

The dolly system 100 can be transported in a variety of fashions and utilized in a variety of settings. It will be appreciated that although the illustrated embodiments and uses of the dolly system 100 may constitute elements of one or more embodiments of the invention, the present invention is not limited to the illustrated embodiments. In addition, the dolly system 100, in and of itself, includes several inventive aspects and features that are completely independent of the use and transportation of the dolly system 100.

Figure 10:
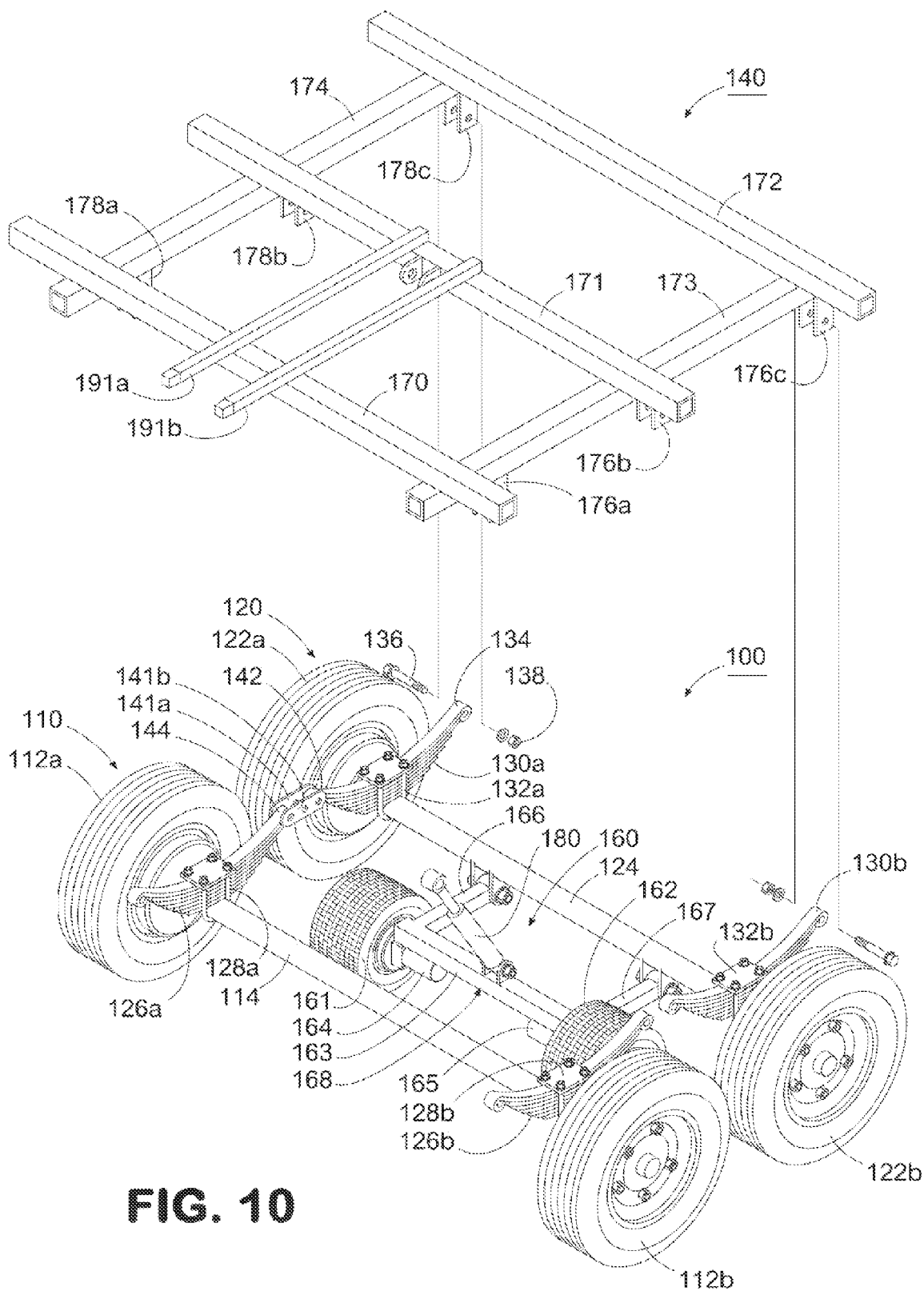
FIG. 10 is an exploded perspective view of various features and components of an exemplary dolly system.

FIG. 10 is an exploded perspective view of various features and components of an exemplary dolly system. In the illustrated embodiment, the dolly system 100 is shown as including two tandem transport wheel assemblies 110 and 120. The first tandem transport wheel assembly 110 includes two wheels 112a and 112b connected via transport wheel axel 114. The second wheel assembly 120 also includes two wheels 122a and 122b connected via transport wheel axel 124. In the illustrated embodiment, the wheels 112a-b and 122a-b of the wheel assemblies 110 and 120 are road-ready wheels including rims and tires and are mounted to the respective axel 114 or 124 with a series of lug nuts. It will be appreciated that the wheel assemblies 110 and 120 may also include braking systems, such as disc brakes or drum brakes, may have more than two wheels per axel, and can use a variety of wheel types and sizes. It will also be appreciated that the present invention may also be implemented using a single axel or more than two axels (hence a single wheel assembly or any number of wheel assemblies).

Each of the illustrated wheel assemblies 110 and 120 may include suspension springs or some other vibration or shock absorbing means. In the illustrated embodiment, the suspension springs are mounted to the axel of the wheel assemblies and a frame 140 of the dolly. More specifically, the wheel assembly 110 includes a suspension spring 126a that is mounted to one end of the axel 114 using a connector assembly 128a. In the illustrated embodiment, the connector assembly 128a is shown as including two U-bolts that fit under the axel 114, extend along side of the spring 126a and extend through a plate. The U-bolts are then secured to the plate with hex nuts. However, it will be appreciated that this is simply a non-limiting example of one technique to mount a suspension spring to the dolly system 100. At the other end of the axel 114, the suspension spring 126b is mounted in a similar fashion using connector assembly 128b. This same structure can also be repeated for axel 124 with suspension springs 130a-b mounted with connector assemblies 132a-b.

The illustrated frame 140 includes three lateral members 170, 171 and 172 which in the illustrated embodiment, run parallel to the axels 114 and 124, and two transverse members 173 and 174 that are perpendicular to the lateral members 170, 171 and 172 and axels 114 and 124. In the illustrated embodiment the lateral members 170, 171 and 172 and the transverse member 173 and 174 are constructed of square tubing manufactured from a heavy gauge steel; however, it will be appreciated that a variety of materials, shapes and configurations may be used in other embodiments of the invention. Further, the illustrated embodiment, although in and of itself is considered to be novel, is not limited to the particular configuration and materials illustrated.

The lateral member 170, 171 and 172 are shown as being mounted on top of and overlapping the transverse members 173 and 174. Proximate with each joint or overlap of a lateral member and a transverse member, a connector is provided. Thus, transverse member 173 includes connector 176a at the joint with lateral member 170, connector 176b at the joint with lateral member 171, and connector 176c at the joint with lateral member 172. Further, transverse member 174 includes connector 178a at the joint with lateral member 170, connector 178b at the joint with lateral member 171 and connector 178c at the joint with lateral member 172. The illustrated connectors 176a-c and 178a-c include two parallel flanges depending downwardly from the transverse member with axially aligned bores extending through both flanges.

The suspension springs 126a, 126b, 132a and 132b are mounted to the frame 140 using the connectors 176a-c and 178a-c. Looking specifically at suspension spring 130a, the end 134 of the suspension spring 130a is placed between the flanges of connector 178c on frame 140 and then secured with a bolt 136 and nut and washer 138. Similarly, one end of suspension springs 126a-b and 130b can respectively be connected to the frame 140 using connectors 178a, 176a and 176c respectively.

In the illustrated embodiment, plates 141a-b are connected on opposing sides of suspension springs 130a and 126a at ends 142 and 144. The connector 178b can then be bolted to the plates 141a-b to secure ends 142 and 144 of suspension springs 130a and 128a to the frame 140 In an alternative embodiment, the connector 178b can be configured as a T'd flange to support connections with the ends 142 and 144 of suspension springs 130a and 128a. A similar configuration is applied in connecting suspension springs 130b and 126b to frame 140.

FIG. 10 also shows a traction wheel or drive wheel assembly 160 that is mounted to the frame 140 and an axel (axel 124 in the illustrated embodiment). The illustrated drive wheel assembly 160 includes two traction wheels 161 and 162 that are connected to a drive wheel swing arm assembly 163 by drive motors 164 and 165 respectively. The drive motors in an exemplary embodiment are reversible hydraulic motors that can be individually and/or independently controlled to maximize the maneuverability of the dolly system 100. In one embodiment, the drive motors 164 and 165 may be hydraulically controlled motors while in another embodiments, others types of motors, engines or drives can be used to drive the drive wheels, such as gasoline, diesel, or electric motors or other rotary engines as non-limiting examples. The illustrated drive wheel swing arm assembly 163 includes two arms 166 and 167 that are connected to opposing ends of a cross-member 168. Each of the arms 166 and 167 is shown as being pivotally connected to the same axel 124. The arms 166 and 167 can be pivotally connected to the axel 124 in a variety of manners and the illustrated embodiment shows the use of a swing arm journal consisting of two parallel flanges with axially aligned bores extending through the flanges. The void, located between the flanges, receives an end of the arm which also includes a bore there thru that can be axially aligned with the bore extending through the flanges. A bolt or pin can then be used to secure the arm to the axel.

In the illustrated embodiment, the drive wheel swing arm 163 attaches to the frame 140 via an up/down drive wheel cylinder 180 which may include a hydraulic arm. One end of the hydraulic arm 180 attaches pivotally to the cross-member 168 of the drive wheel swing arm assembly 163 similar to the afore-described structure. The other end of the hydraulic arm 180 pivotally attaches to the central lateral member 171 of the frame 140. The hydraulic arm 180 operates to extend the drive wheel assembly 160 so that the traction wheels are in contact with the ground or, to retract the traction wheel assembly 160.

A lift-arm connector assembly including two arms 191a-b are illustrated as being mounted above the lateral members 170 and 171 and transverse to the same. The lift-arm connector assembly mates with the connector 310 on the boom 300 for lifting the dolly system 100.

Figure 11:
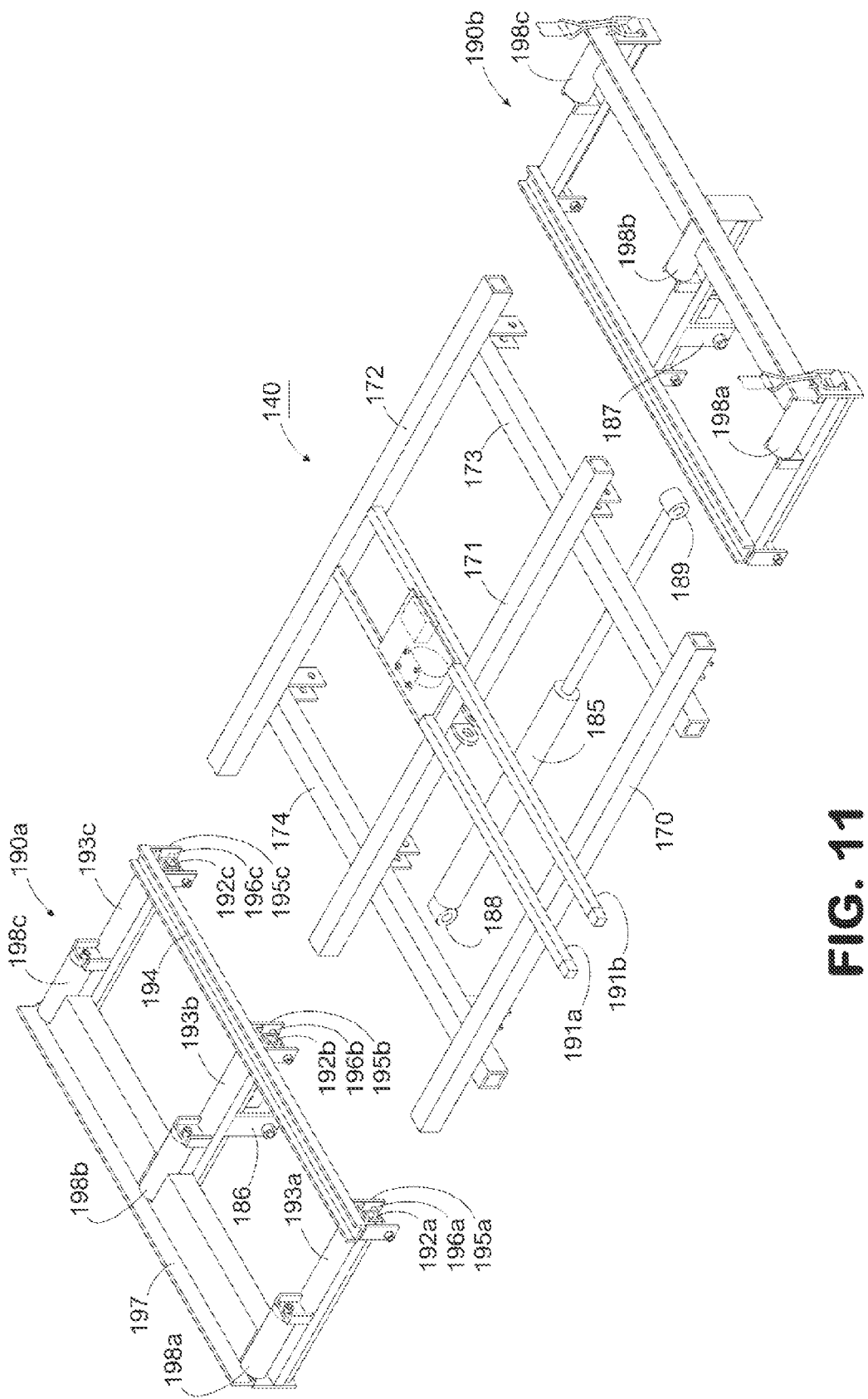
FIG. 11 is a perspective view of the frame including further details and inventive aspects.

FIG. 11 is a perspective view of the frame including further details and inventive aspects. The lateral members 170, 171 and 172 of the frame 140, as previously described, are illustrated as being constructed from square tubing. It should be appreciated that the particular shapes and materials illustrated and described are simply one embodiment or implementation of the various aspects of the invention and other suitable materials and shapes could be employed in other embodiments. FIG. 11 illustrates two load locking assemblies 190a-b. Because the load locking assemblies 190a-b are constructed and operate the same, only one such structure is described in detail.

The load locking assembly 190 includes three inserts 192a-c that respectively correspond to the lateral members 170, 171 and 172. The inserts 192a-c are configured so that they can be inserted into the square tubes of the lateral members 170, 171 and 172. A c-shaped cover 193a-c is positioned over the inserts 192a-c respectively and are joined by a cross-brace 194. The cross-brace 194 includes three c-clamps 195a-c that include two parallel flanges with axially aligned bores extending through them. A roller pin 196a-c is inserted through the bores of the c-clamps 195a-c and secured in place. The inserts 192a-c and the c-shaped covers 193a-c are secured to an edge brace 197. In operation, the inserts 192a-c are inserted into the square tubes 170-172 and the square tubes 170-172 are inserted within the c-clamps 195a-c and over the roller pins 196a-c. As such, the load locking assembly 190 can slide in and out of the frame 140 to accommodate loads of varying size. For instance, the load locking assembly 190 can be slid into the frame 140 to bring the load edge brace 197 in contact with the load to be carried. In one embodiment, the load locking assembly is hydraulically driven to automatically engage or retract the load locking assembly 190. In other embodiments the load locking assemblies may be moved manually and then pressure screwed, clamped, pinned or bolted into a desired position or they may be cranked into position. In another embodiment, the locking clamps may include a lip that protrudes towards the center of the frame 140 and that can overlap a lip or edge of a load to further secure the load to the dolly 100.

The load locking assembly 190 is shown as including rollers 198a-c. The rollers 198a-c are shown as being slightly raised above the plane defined by the load edge brace 197 to facilitate moving of a load relative to the dolly system 100. The rollers 198a-c are positioned such that they rotate about an axis that is parallel with the lateral members 170, 171 and 172. In one embodiment, the rollers 198a-c may be mounted in a fixed manner while in other embodiments, a hydraulic cylinder may be used to raise or lower the rollers 198a-c.

The load locking assemblies 190a-b can be manually maneuvered, such a by sliding the assemblies in and out of the square tubes 170-172 and then clamped, locked, pinned, etc. in to position. Alternatively, the load locking assemblies can be geared and maneuvered through a crank arm assembly. In yet another embodiment, a winch or "come-a-long" type mechanisms can be utilized to maneuver the load locking assemblies 190a-b. In the illustrated embodiment, a hydraulic member 185 is shown as being used to maneuver the load locking assemblies 190a-b. One load locking assembly 190a includes a mounting collar 186 to receive the cylinder end 188 of the hydraulic device 180. The other load locking assembly 190b includes a color 187 for receiving the piston end 189 of the hydraulic device 180. By actuating the hydraulic device 180, the load locking assemblies 190a-b can be drawn in to secure the dolly system 100 to a container or expanded to release the dolly system 100.

Figure 12:
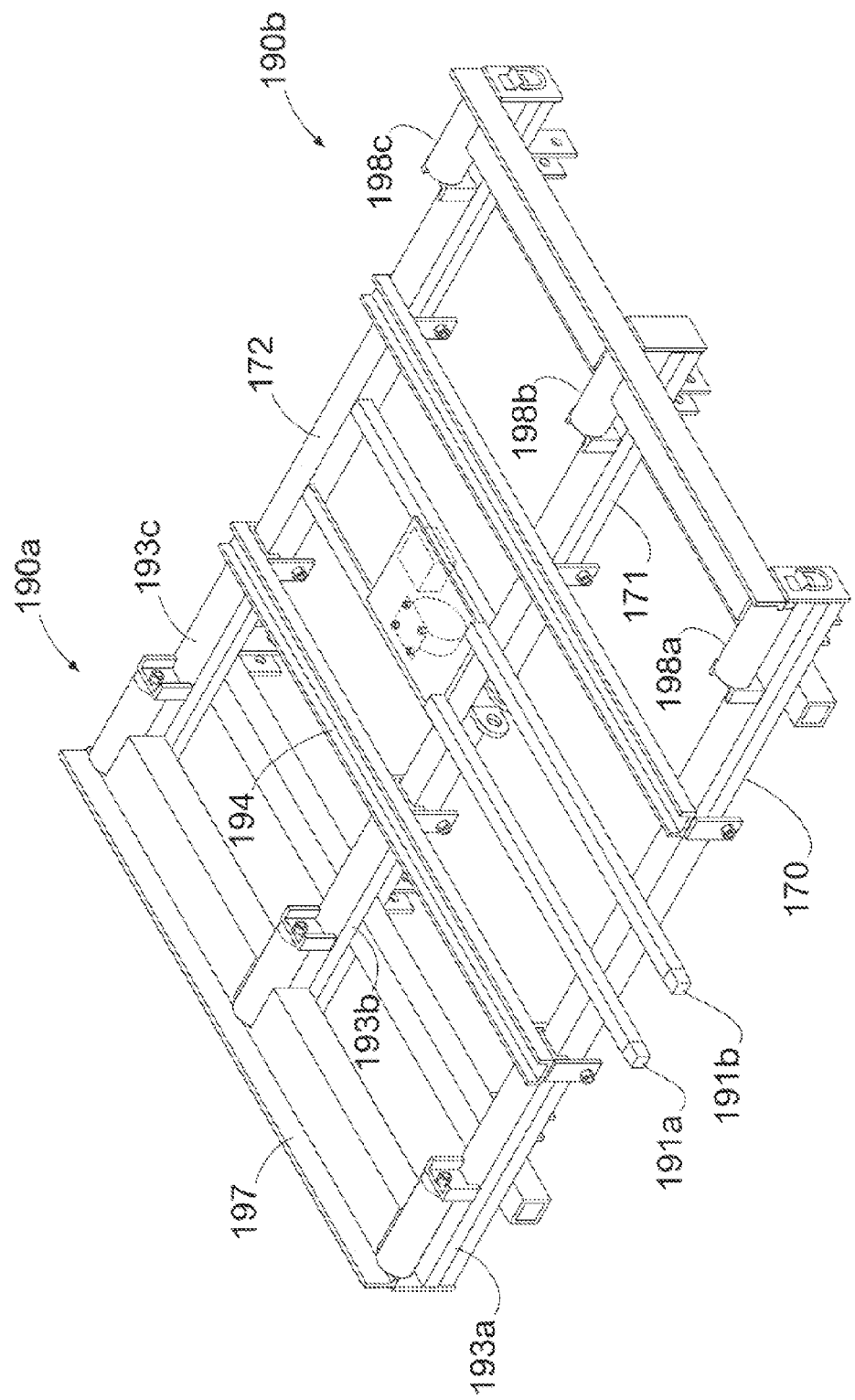
FIG. 12 is a perspective view of the assembled frame including the load locking assemblies being installed.

FIG. 12 is a perspective view of the assembled frame including the load locking assemblies being installed.

Figure 13:
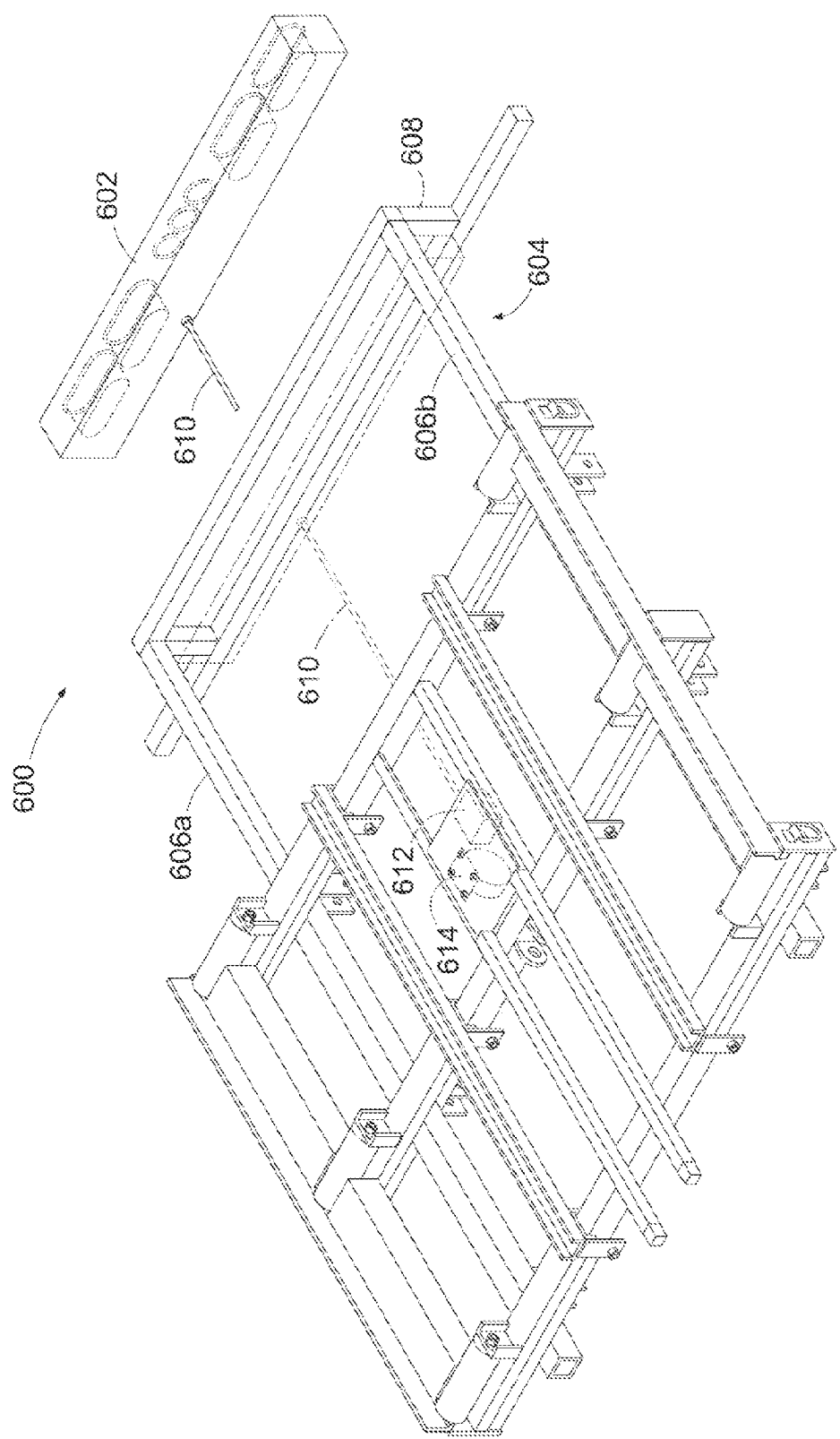
FIG. 13 is an exploded perspective view of dolly system frame including a telescoping bumper and tail light assembly.

FIG. 13 is an exploded perspective view of the dolly system frame including a telescoping bumper and tail light assembly. The illustrated tail light assembly 600 includes a light box 602 and a mounting frame 604. The mounting frame 604 includes two extension arms 606a-b and a light box frame 608. The light box frame 608 includes a frame having one or more members to which the light box 602 can be mounted. The extension arms 606a-b are configured to slide into the hollow center of the transverse members 173 and 174 respectively. The extension arms 606a-b can be mounted in such a way to allow the extension arms 606a-b to slide in and out of the hollow centers of the transverse members 172 and 174 and then be clamped, pinned, chained, screwed, etc. into a desired position. The light box 602 can be secured to the light box receptor 608 in a variety of manners including screws, clamps, flanges, pins, etc. Advantageously, this configuration allows for the light box 602 to be adjusted to a desired position thereby allowing the lights to meet the requirements imposed by the Department of Transportation regulations. In an alternate embodiment, the light box 602 or the entire light assembly 600 may include twist lock connectors for mounting directly to a container.

In one embodiment, the light box 602 includes a wiring harness 610 that interconnects to the various lighting sources within the light box (i.e., brake lights, back-up lights, blinkers, hazards, etc.) and then connects either to a wirelessly controlled controller box 612 or some other controller box that can be physically wired into to wiring system of a road tractor, or other vehicle that may be operating in conjunction with the dolly system 100. In the illustrated embodiment, the wiring harness 610 connects to a controller box through an retraction device 614 that operates to retract the cord and wind it around a spool when it is not in use. The retractor can be spring loaded similar to a measuring tape type structure. In other embodiments, the retractor can be hand-cranked, motorized, counter-weighted, etc. When the light box 602 is connected, the wiring harness 610 can be extracted and plugged into the light box 602.

Figure 14:
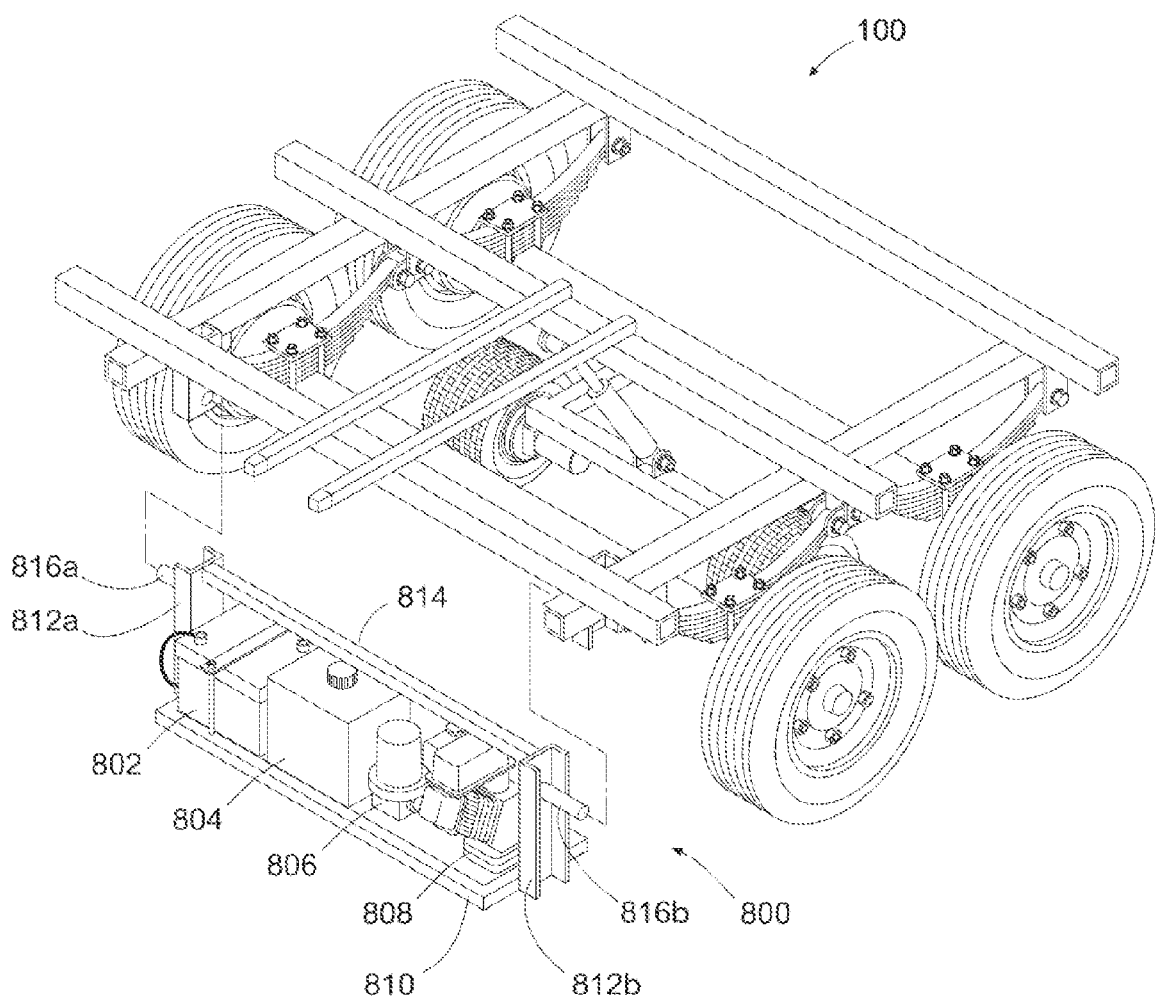
FIG. 14 is an exploded perspective view of the dolly system including a pivoting motor mount carrousel 800.

FIG. 14 is an exploded perspective view of the dolly system including a pivoting motor mount carrousel 800. The main components mounted onto the motor mount carrousel 800 include a battery 802, a hydraulic oil reservoir 804, a hydraulic pump motor 806 and an engine/fuel tank 808. The carrousel 800 includes a tray or shelf 810 and mounting pins 816a-b. Each of the components are mounted to the tray or shelf 810. In an exemplary embodiment, the tray or shelf 810 may be constructed of a square tubing frame with one or more cross-members, with optional plates welded thereto, to support the various elements. The carrousel may include vertically extending risers 812a-b on each end and a support bar 814 extending between the tops of the vertically extending risers 812a-b over the main components. Each vertical riser 812 includes a pin 816 that extends outwardly from the vertical riser and that pivotally mounts to the frame 140. Advantageously, this structure enables the motor carrousel 800 to freely pivot as the dolly system 100 is being lifted and placed onto the dolly mount 200 or the ground. As can be more fully appreciated by examining FIGS. 1-4, in the illustrated embodiment the dolly system 100 is rotated a full 180 degrees in the illustrations. The pivoting motor assembly 800 enables the dolly system 100 to be maneuvered in such a manner without the motor assembly components being inverted, thereby spilling fluids, etc. It other embodiments, additional rotation of the carrousel may be required. Advantageously, the illustrated embodiment can allow for 360 degrees of rotation. It will be appreciated that this is simply one exemplary embodiment and various other techniques and structures could be used. For instance, the pins 816a-b may be mounted to the frame and the carrousel 800 may include bores to receive the pins 816a-b. Alternatively, the risers 812a-b may be welded to the frame 140 and the pins 816a-b inserted through the risers 812a-b.

It will also be appreciated that other aspects of the dolly system 100 can be controlled by other means. FIG. 5A illustrates an exemplary user interface panel for the control box 702 illustrated in FIG. 5. The user interface panel 706 includes control buttons to perform various tasks. For instance, the engine 808 can be turned on by actuating the START button 708 or turned off by actuating the OFF button 710. After turning the engine 808 on, the drive wheel assembly 160 can then be lowered by actuating the DOWN button 712 and then raised again by actuating the UP button 714. In the illustrated embodiment, both of the wheels of the drive wheel assembly 160 are drive wheels. As such, the control panel 706 includes a button to cause the left wheel to rotate in a manner to induce forward motion 716 and a button to cause the left wheel to rotate in a manner to induce reverse motion 718. Similarly, the right wheel includes a forward button 720 and a reverse button 722. Using the forward and reverse controls, a dolly system 100 can be maneuvered under a load. To secure the load to the dolly system 100, the load locking assembly rails 190a-b can be opened to receive the load by actuating the RAILS OPEN button 724. Once opened, the load can be set onto the dolly system 100 and the load locking assembly raise 190a-b can be closed or locked onto the load by actuating the RAILS CLOSED button 726. Other buttons may be used to control other items as well. For instance, button A 728 could be used to turn the lights of the light box 602 on or off. Another button B 730 may be used raise or lower the rollers 198a-c. In other embodiments, buttons, switches, turn-knobs, levers, etc. can also be included for controlling the operation of the boom 300.

The dolly system mounted controller box 612 includes an antenna, a receiver and a microcontroller for interpreting commands and settings and taking appropriate actions to control the various cylinders and other control mechanisms on the dolly system 100. In general, the controller 702 communicates with the controller box 612 through a wireless connection, such as the unlicensed RF spectrum. However, those skilled in the art will appreciate that any form of wireless or wired communication may also be employed in various embodiments of the present invention.

In one embodiment, the cab 400 may also include a cab-controller 402 with a transmitter to communication with the controller box 612. The cab-controller 402 can be wired into the wiring bus for the cab, or otherwise connected to the electrical system of the cab so that if the brakes are activated, or if the driver turns on the lights, appropriate signals can be transmitted to the controller box 612 to appropriately activate the lights. In addition, in some embodiments, the wheel assemblies 110 and 120 may include braking systems that can be controlled by the controller box 612. In such an embodiment, actuating the brakes in the cab 400 can result in applying the brakes of the wheel assemblies 110 and/or 120.

Figure 16:
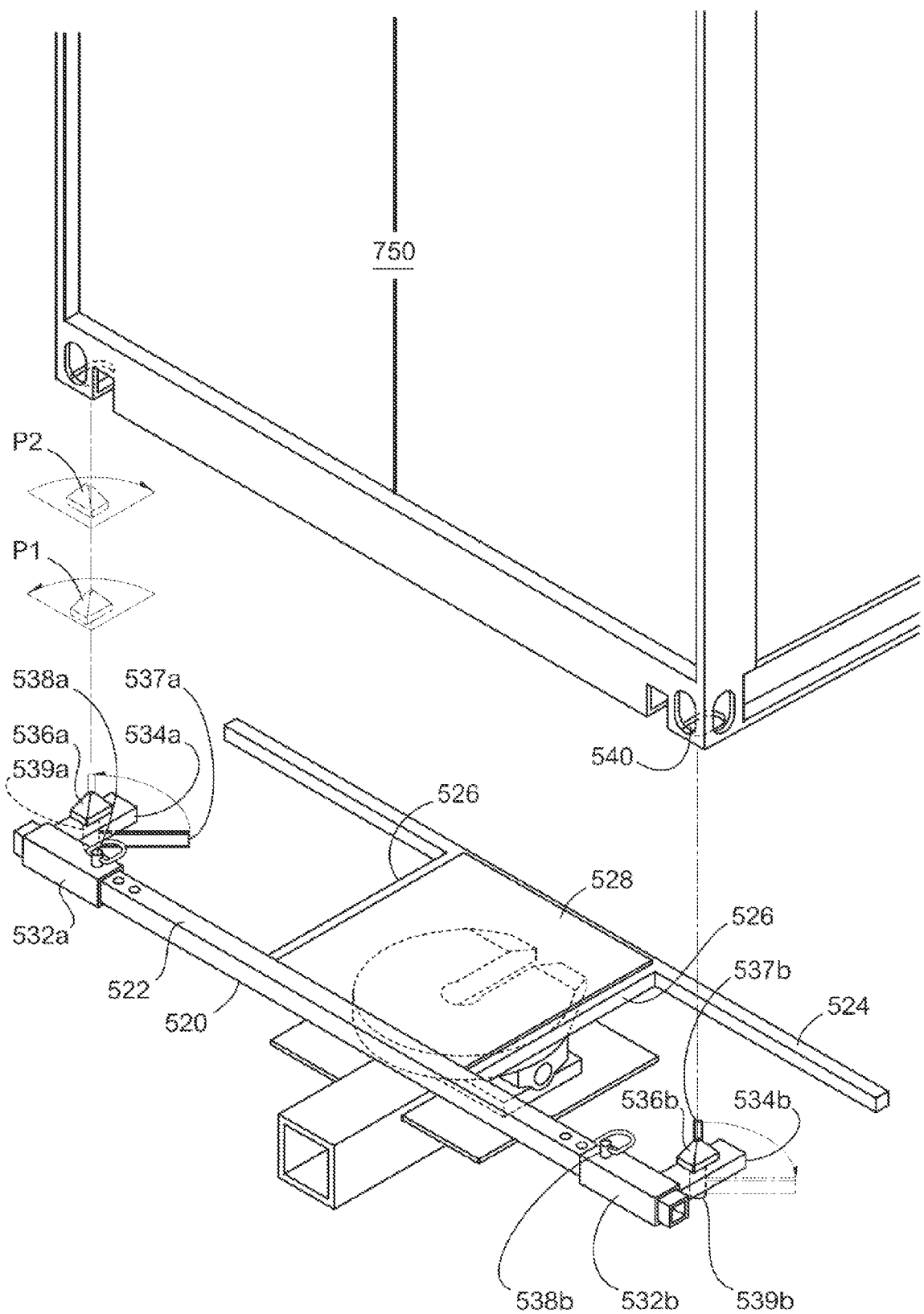
FIG. 16 is a perspective view of an exemplary turntable system.

FIG. 16 is a perspective-view of a turntable. As previously described, in an exemplary embodiment the boom 300 is adjoined to a frame 500. A fifth wheel 510 is adjoined to the boom 300 and a turntable 520 can include a king pin for mating with and being attached to the fifth wheel 510. The turntable 520 includes a mounting bar 522 and a support bar 524. In an exemplary embodiment, the mounting bar 522 is constructed of three inch square tubing and the support bar 524 is constructed of 2 inch square tubing. The mounting bar 522 is mounted parallel to the support bar 524 through one or more cross-braces 526. A metal plate 528 is secured over the top of the cross-braces 526 and another metal plate may also be secured under the cross-braces 526. Not shown in the diagrams, a king pin can be mounted to the lower metal plate or the back side of the turntable 520 for mounting the turntable 520 to a fifth wheel 510.

The mounting bar 522 includes a sleeve 532a-b on each end. The sleeves 532a-b can be slid between various positions and secured in place by one or more pins or cogs 538a-b being inserted through bores in the sleeve 532 when they are aligned with bores in the mounting bar 522. Each sleeve 532a-b includes a mounting protrusion 534a-b respectively that is welded, bolted or otherwise adhered or integral to the sleeve 532a-b. Each mounting protrusion 534a-b includes a twist lock 536a-b that can be maneuvered between position P1 and position P2 by actuating a lever 537a-b attached to a shaft 539a-b that depends from the twist lock 536a-b and the mounting protrusion 534a-b. The container can be placed onto the twist locks 536a-b while they are in position P1 and then locked into position by actuating the levers 537a-b to move the twist locks to position P2. In one embodiment, the twist lock may be configured to lock into a receptacle located on the bottom of the container 540 that resembles 910a-b or, in other embodiments, the twist locks may be configured to fit into other slots or channels that are a part of a container's construction attributes. The sleeves 532a-b can be slid along the mounting bar 522 to accommodate various sizes of containers.

Figure 17:
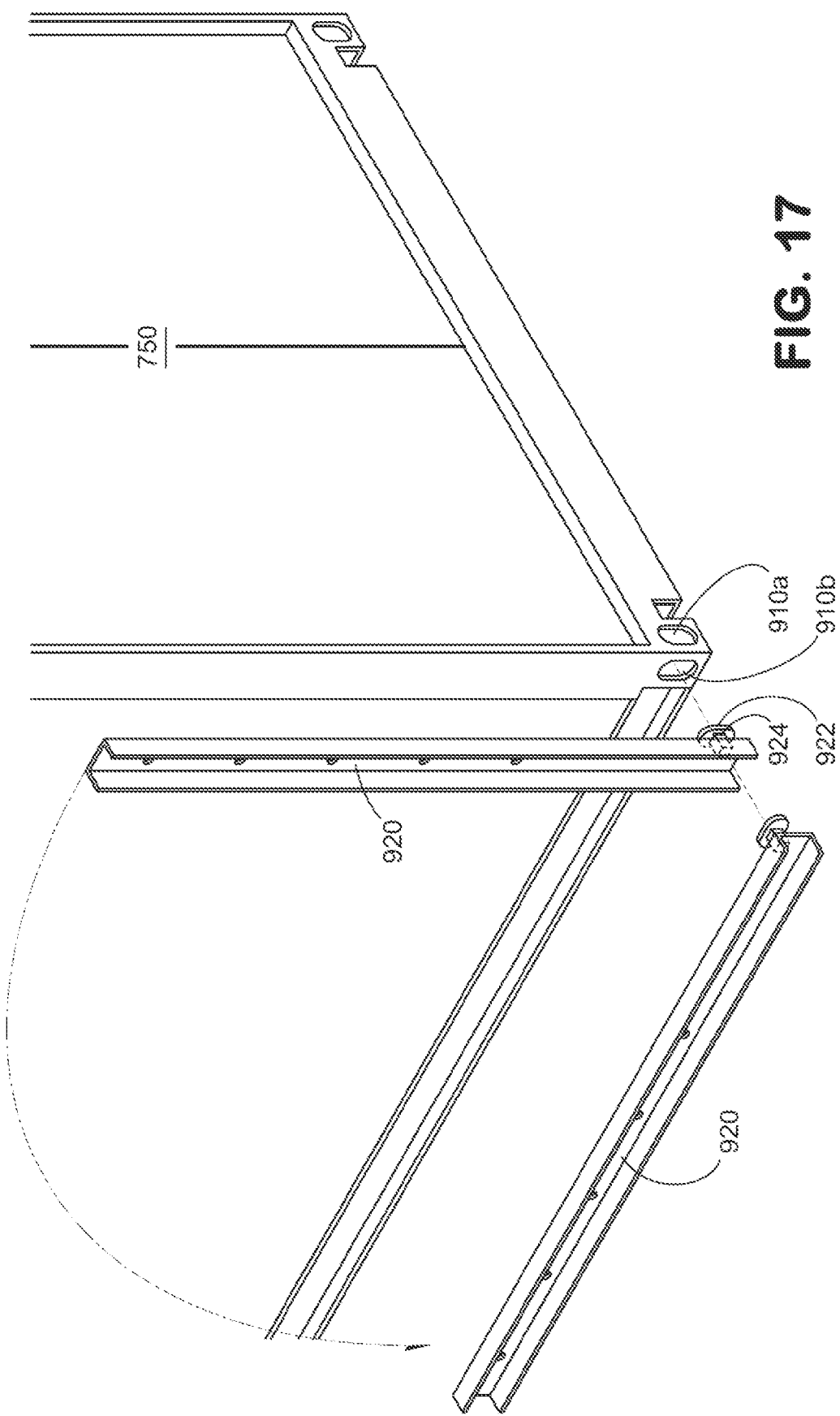
FIG. 17 is a perspective view of a dolly-lock apparatus that can be used in securing a dolly system to a shipping container.

FIG. 17 is a perspective view of a dolly-lock arm that can be used in securing a dolly system to a shipping container. A lower corner of a container 750 is shown with twist-lock receptacles 910a-b. A dolly-lock arm 920 is shown in a vertical or upright position. The dolly-lock arm 920 includes a lock 922 mounted to the dolly-lock arm 920 via stem 924. The dolly-lock arm 920 includes a series of bores along the length of the arm. In operation, the dolly-lock arm is inserted into the twist-lock receptacle 910b in the illustrated orientation, and is then rotated 90 degrees towards the front of the container. In the rotated position, the dolly-lock arm 920 is secured within the twist-lock receptacle 910b. One or more bores in the dolly-lock arm 920 can then be aligned with one or more bores in the edge brace 197 (shown in FIG. 11 without the mating bores) of the dolly system 100. In other embodiments the dolly-lock arm can simply be clamped, chained, pinned or otherwise affixed to the dolly system 100. Advantageously, this feature helps to secure the dolly system 100 to the load 750 and prevent the dolly system 100 from sliding backwards or forwards relative to the load 750. Other mechanisms are also anticipated for connecting the dolly system 100 to a load 750, including without limitation, the straps illustrated in FIGS. 6 and 7, a clamp, a turnbuckle, bolts, pressure, overlapping lips, pins, cogs, etc.

FIG. 18 is an exemplary T-bar that can be attached to the boom to facilitate loading, lifting and moving of a load or container. The illustrated T-bar 950 is fabricated from 6 inch by 4 inch metal tubing and includes a mounting collar 952 for receiving the end of the second length 314 of extension arm 306. The mounting collar 952 includes two flanges with axially aligned bores extending through the flanges. The end of the second length 314 of extension arm 306 includes a finger 311 with a bore extending through the finger 311. The bore in the finger 311 can be aligned with the bores through the mounting collar 952 and secured in place by a pin, chain, clamp, etc. The T-bar 950 may further include rings or hooks 954a-b for securing or holding a chain, or may include some other type of connecting apparatus such as twist-locks, adjustable twist-locks, hooks, clamps, etc. In operation, the T-bar 950 can be connected to the boom 300 and used to lift an end of the load 750, maneuver the load 750 or perform various other tasks.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A dolly system used in the transport and delivery of containers, the dolly system comprising:
a free standing dolly comprising:
a plurality of road ready wheels mounted to at least one axel;
a dolly frame coupled to the at least one axel and including an upper surface for receiving the bottom side of a container wherein the bottom side of the container rests upon the upper surface of the dolly frame, the dolly frame being width-wise adjustable;
a self-contained and self-powered drive system mounted to the free standing dolly that maneuvers the free standing dolly into a desired position for receiving the container and for moving the container to a destination, the self-contained and self-powered drive system maneuvering the free standing dolly system by controlling one or more traction wheels, wherein the traction wheels are in addition to the road ready wheels; and
a boom that is mounted to a transport vehicle, the boom can be coupled to one end of the container to lift and maneuver the container into a desired position and to the free standing dolly for maneuvering the dolly from an operational position to a storage position; and
a mount that is mounted to the transport vehicle for receiving and storage of the free standing dolly;
wherein the boom can be operated to lift one end of the container thereby allowing the free standing dolly to be maneuvered under the container, and wherein the width of the dolly can be adjusted to the width of the container and secured to the container, and further, by controlling the self-contained drive system, the free standing dolly can maneuver the container into a desired position and, connecting the container with the free standing dolly secured thereto to the transport vehicle, the container can be transported over the road.

2. The dolly system of claim 1, wherein the drive system includes a receiver and a remote control that enables a user to maneuver the free standing dolly by actuating the remote control to send control signals to the receiver.

3. The dolly system of claim 2, wherein the motor is coupled to the free standing dolly frame using a swiveling mounting.

4. The dolly system of claim 3, wherein the swiveling mounting swivels at least approximately 180 degrees and operates to maintain the motor in an upright position when the free standing dolly is being moved from a stored position to an operational position.

5. The dolly system of claim 2, wherein the free standing dolly includes at least two traction wheels with each including a traction wheel motor, the traction wheel motors independently drive the at least two traction wheels to maneuver the dolly into a desired position.

6. The dolly system of claim 1, wherein the drive system includes a receiver and a processor, and in response to signals received by the receiver, the processor is operable to control the operation of the motor.

7. The dolly system of claim 1, wherein the length of the dolly frame is substantially shorter than the length of the container and further comprises a locking clamp that is operable to secure the container to the frame over the surface for receiving the bottom side of the container.

8. The dolly system of claim 7, wherein the locking clamp comprises a left side arm and a right side arm, each arm being slideably coupled to the dolly frame and situated relative to the surface for receiving the bottom side of the container so that the right side arm is on the outside of one side of the container and the left side arm is on the outside of the other side of the container, and wherein a hydraulic actuator is operable to slide the right side arm and the left side arm towards the container and thereby clamp the dolly frame to the container.

9. The dolly system of claim 1, wherein the boom is mounted to the frame of a road tractor and the mount for receiving and storage of the dolly is positioned over the top of the cab of the road tractor, and wherein the boom is operable to lift the dolly from the ground and place the dolly on the mount.

10. A dolly system used in the transport and delivery of containers by a transport vehicle, the dolly system comprising:
  a free standing dolly, a mount and a boom, wherein the mount and the boom are coupled to the transport vehicle;
  the free standing dolly comprising:
    a plurality of road-ready wheels mounted to at least one axel;
    a dolly frame coupled to the at least one axel and including a surface for receiving the bottom side of a container, the surface having a substantially smaller area than the area of the bottom side of the container; and
    a self-contained and self-powered motor that is coupled to the frame and under user control drives at least one of the wheels for the maneuvering of the free standing dolly;
  the boom that can be coupled to one end of the container for lifting and maneuvering the container and to the free standing dolly for lifting and storing the free standing dolly on the transport vehicle; and
  a mount for receiving and storage of the dolly;
  wherein one end of the container can be connected to the boom and lifted, and the free standing dolly can be maneuvered under the container and then secured to the container, and wherein when secured to the container, the free standing dolly can be used for transporting the container on the road and maneuvering the container into a desired position.

11. The dolly system of claim 10, wherein the motor is coupled to the frame using a swivel mounting.

12. The dolly system of claim 11, wherein the free standing dolly includes at least two traction wheels that are separate from the road ready wheels and the motor is operable to drive the at least two traction wheels to maneuver the dolly into a desired position.

13. The dolly system of claim 12, wherein the drive system includes a receiver and a processor, and in response to control signals received by the receiver, the processor is operable to control the operation of the motor.

14. The dolly system of claim 13, further comprising a control box that transmits the control signals.

15. The dolly system of claim 14, wherein a fifth wheel is attached to the boom and a turntable including a king pin is coupled to the fifth wheel and wherein the system is operable to load a container by:
  coupling the boom to a first end of a container and lifting the first end of the container to a sufficient height to accommodate the free standing dolly;
  using the control box to position the free standing dolly under the container at a position towards the second end of the container;
  lowering the first end of the container onto the turntable and securing the first end of the container to the turntable;
  controlling the traction wheels to maneuver the free standing dolly proximate to the second end of the container; and
  coupling the free standing dolly to the container.

16. The dolly system of claim 14, wherein the system is operable to unload a container by:
  decoupling the free standing dolly from the container;
  controlling the traction wheels to maneuver the dolly a distance towards the front end of the container;
  recoupling the free standing dolly to the container;
  decoupling the first end of the container from the turntable and raising the first end of the container with the boom;
  using the control box to maneuver the free standing dolly and thereby position the container in a desired location;
  decoupling the free standing dolly from the container;
  extract the free standing dolly from under the container;
  lowering the first end of the container to the ground; and
  uncoupling the boom from the first end of the container.

\* \* \* \* \*